(12) United States Patent
Newell

(10) Patent No.: US 9,623,891 B2
(45) Date of Patent: Apr. 18, 2017

(54) PALLET JACK POWER ASSEMBLY

(71) Applicant: Power Handling, Incorporated, Spokane, WA (US)

(72) Inventor: Greg Newell, Liberty Lake, WA (US)

(73) Assignee: Power Handling, Incorporated, Spokane, WA (US)

(*) Notice: Subject to any disclaimer, the term of this patent is extended or adjusted under 35 U.S.C. 154(b) by 107 days.

(21) Appl. No.: 14/306,210

(22) Filed: Jun. 16, 2014

(65) Prior Publication Data

US 2014/0291594 A1 Oct. 2, 2014

Related U.S. Application Data

(63) Continuation-in-part of application No. 13/090,156, filed on Apr. 19, 2011, now Pat. No. 8,752,657.

(51) Int. Cl.
*B62B 3/04* (2006.01)
*B62D 51/04* (2006.01)
*B62B 3/06* (2006.01)
*B62B 5/00* (2006.01)

(52) U.S. Cl.
CPC .......... *B62B 3/0612* (2013.01); *B62B 5/0033* (2013.01); *B62B 5/0059* (2013.01); *B62B 2301/23* (2013.01)

(58) Field of Classification Search
CPC . B62B 3/0606; B62B 3/06012; B62B 3/0618; B62B 5/005; B62B 3/0012; B62B 5/0033; B62B 5/0059; B62B 2301/23; B66F 9/06; B66F 9/065; B62D 51/04

USPC .......... 180/15, 19.1, 19.2, 19.3; 280/43.11, 280/43.12, 43.15, 43.16
See application file for complete search history.

(56) References Cited

U.S. PATENT DOCUMENTS

| | | | | |
|---|---|---|---|---|
| 1,346,914 A | * | 7/1920 | Sauvage | ................ B62D 51/02 180/214 |
| 2,592,091 A | | 4/1952 | Weaver | |
| 3,181,640 A | * | 5/1965 | Goodacre | ............. B62B 3/0612 180/19.2 |
| 3,188,107 A | * | 6/1965 | Quayle | ................. B62B 3/0618 254/2 R |
| 3,291,243 A | * | 12/1966 | Friesser | .................... B60K 1/00 180/19.1 |
| 3,601,423 A | | 8/1971 | Goodacre | |
| 3,684,046 A | | 8/1972 | Begleiter | |

(Continued)

FOREIGN PATENT DOCUMENTS

| | | |
|---|---|---|
| EP | 0150830 | 8/1985 |
| FR | 2607076 | 5/1988 |

(Continued)

OTHER PUBLICATIONS

Canadian Notice of Allowance, dated Aug. 7, 2012, 1 page.

(Continued)

*Primary Examiner* — Anne Marie Boehler
(74) *Attorney, Agent, or Firm* — Lee & Hayes, PLLC

(57) ABSTRACT

A pallet jack includes a forked frame and a jacking cylinder, and is supported at least in part by left and right steering wheels. A drive wheel may be located between the left and right steering wheels, with a center of each of the steering wheels and a center of the drive wheel located in a co-planar orientation. A motor provides power to the drive wheel.

20 Claims, 32 Drawing Sheets

(56) References Cited

U.S. PATENT DOCUMENTS

| | | | |
|---|---|---|---|
| 4,105,084 A | 8/1978 | Baak | |
| 4,287,959 A * | 9/1981 | Inman | B60K 1/02 |
| | | | 180/12 |
| 4,431,084 A * | 2/1984 | Jones | B60G 11/14 |
| | | | 180/209 |
| 4,571,139 A | 2/1986 | Moseley et al. | |
| 4,615,533 A * | 10/1986 | Sewell | B62B 3/0618 |
| | | | 280/43.12 |
| 4,750,579 A | 6/1988 | Jarl et al. | |
| 5,113,960 A | 5/1992 | Prinz | |
| 6,866,113 B2 * | 3/2005 | Sugata | B66F 9/07568 |
| | | | 180/253 |
| 7,597,331 B2 * | 10/2009 | Schulte | B62K 13/04 |
| | | | 280/259 |
| 7,597,522 B2 | 10/2009 | Borntrager et al. | |
| 7,913,792 B2 * | 3/2011 | Bruno | B66F 9/07518 |
| | | | 180/209 |
| 2008/0053744 A1 | 3/2008 | Krenzin et al. | |
| 2012/0080858 A1 * | 4/2012 | Larringan Errasti | B62B 3/06 |
| | | | 280/43.12 |

FOREIGN PATENT DOCUMENTS

| | | | | |
|---|---|---|---|---|
| FR | 2696105 | * | 9/1992 | B60K 1/00 |
| FR | 2690123 | | 10/1993 | |
| RU | 2033929C1-DEV | | 4/1995 | |
| SU | 802117 | | 2/1981 | |
| SU | 1303532 | | 4/1987 | |
| WO | 90/12624 | * | 11/1990 | A63B 55/08 |

OTHER PUBLICATIONS

Linde Forklift; http://www.liftec.ru/en/video.html?v=42&t; retrieved Feb. 14, 2011; 2 pages.

Linde Material Handling, Retrieved on Feb. 15, 2011 at <<http://www.liftec.ru/en/index.html>> 6 pgs.

Office action for U.S. Appl. No. 13/090,156, mailed on Aug. 7, 2013, Newell, "Pallet Jack Power Assembly", 6 pages.

PCT Preliminary Report on Patentability for PCT/US2012/033633; dated Oct. 22, 2013; 7 pages.

PCT Written Opinion and Search Report, issued Jul. 12, 2012, 9 pages.

Translated Russian Office Action mailed Feb. 5, 2016 for Russian patent application No. 2013151265, a counterpart foreign application of U.S. Pat. No. 8,752,657, 9 pages.

Extended European Search Report mailed Mar. 6, 2015 for European patent application No. 12773695.7, 7 pages.

Translated Russian Office Action mailed Jun. 8, 2016 for Russian patent application No. 2013151265, a counterpart foreign application of U.S. Pat. No. 8,752,657, 6 pages.

* cited by examiner

PALLET JACK POWER ASSEMBLY

This patent application is a continuation in part of, and claims priority to, U.S. patent application Ser. No. 13/090,156, titled "Pallet Jack Power Assembly", filed on 19 Apr. 2011, commonly assigned herewith, and hereby incorporated by reference.

BACKGROUND

Freight, such as retail, commercial and industrial goods, is frequently stored and moved on pallets. Pallet jacks allow an operator to lift and move these pallets. Such pallet jacks are widely used in the manufacturing, warehousing, transportation, and retail industries. A pallet jack may be rolled under a pallet, and the pallet lifted off the floor. Once off the floor, the load may be rolled to a desired location. Pallet jacks that are powered (e.g., motorized) and manual (e.g., hand operated) are widely used.

Known motorized pallet jacks are generally larger than manually powered pallet jacks. They also provide considerably more torque, which can move heavier loads than can be safely moved by a person manually pushing a hand-operated pallet jacks. However, they are also more expensive than hand-operated jacks and require hours-long battery recharge periods.

In contrast, manually powered pallet jacks are compact, lightweight and inexpensive. They are also more readily available—with less maintenance and no recharge periods. They are commonly used aboard trucks for these reasons. However, moving heavy loads with manually powered pallet jacks may be difficult, and even strong users may struggle, particularly on uneven and/or inclined surfaces.

SUMMARY

This application describes techniques for upgrading a manually powered pallet jack with a pallet jack power assembly.

In one example, a pallet jack power assembly upgrades a manually powered pallet jack to provide a motor-driven drive wheel located between two non-driven steering wheels of the pallet jack. The manually powered pallet jack may be of a commonly employed type that includes left and right steering wheels separated by a narrow distance. A frame of the pallet jack power assembly may be adapted for attachment to the manually powered pallet jack. The frame of the pallet jack power assembly supports a drive axle, which in turn supports a drive wheel. Attachment of the frame of the pallet jack power assembly locates the drive wheel between the left and right steering wheels of the manually powered pallet jack. In some embodiments, the drive axle and a steering axle, supporting the left and right steering wheels, may be located in a same vertical plane. Additionally or alternatively, the drive axle may be located under a hydraulic cylinder used to lift the pallet load. The drive axle supporting the drive wheel may be carried by a drive wheel arm, which pivots with respect to the frame. A biasing device, such as a spring, may be used to provide a downward force against the drive wheel arm, to force the drive wheel against the floor or other supporting surface. Such force increases friction between the drive wheel and the floor, thereby reducing slippage between the drive wheel and the floor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s) and/or method(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Figure 1A:
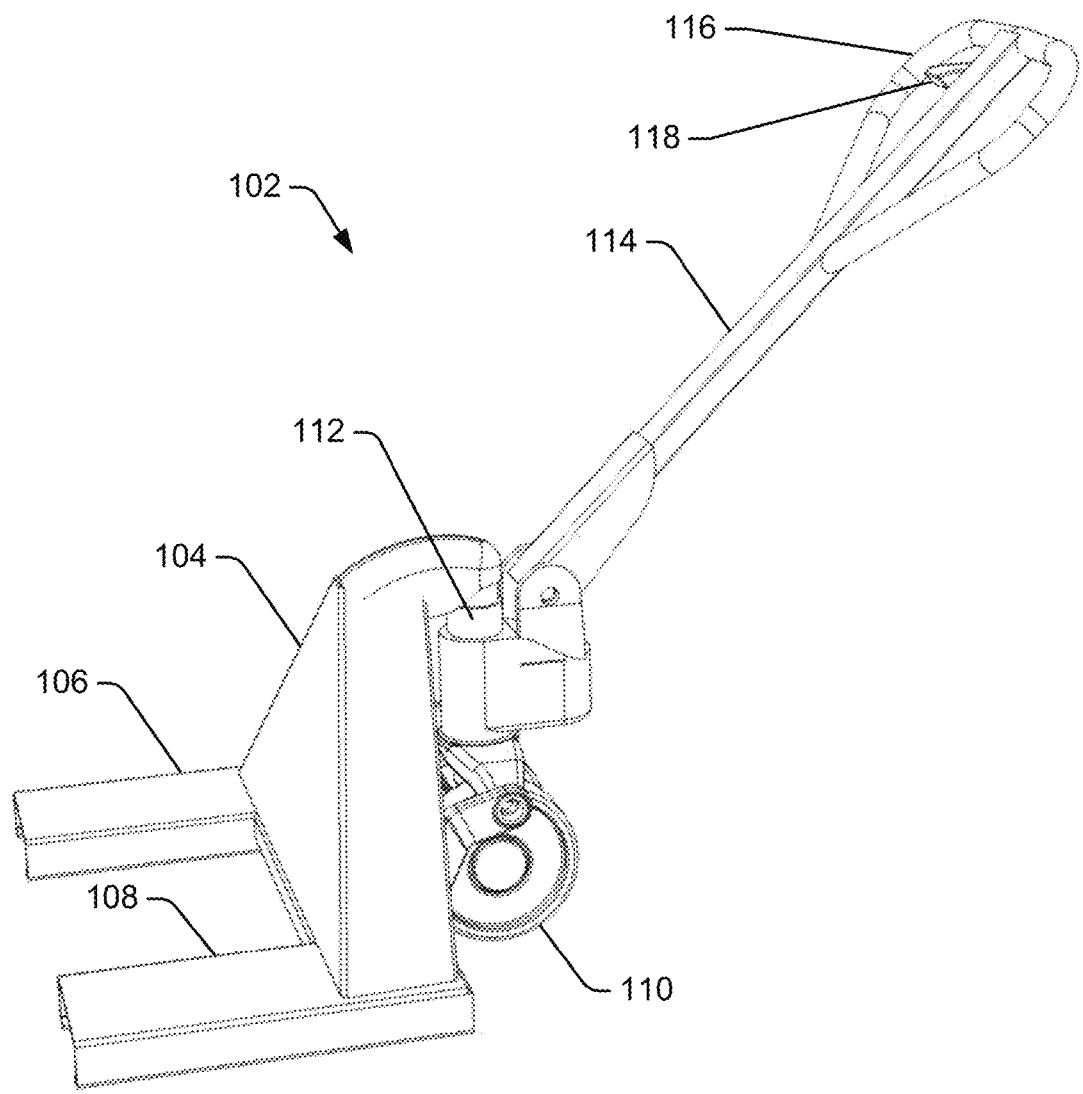
FIG. 1A is a perspective view of a manually powered pallet jack, and represents an example of a pallet jack that may be upgraded by application of a pallet jack power assembly.

This application describes techniques for upgrading a manually powered pallet jack with a pallet jack power assembly.

In one example, a pallet jack power assembly upgrades a manually powered pallet jack to provide a motor-driven drive wheel. The manually powered pallet jack may be of a commonly employed type that includes left and right steering wheels separated by a narrow distance. A frame of the pallet jack power assembly may be adapted for attachment to the manually powered pallet jack. The frame of the pallet jack power assembly supports a drive axle, which in turn supports a drive wheel. Attachment of the frame of the pallet jack power assembly locates the drive wheel between the left and right steering wheels of the manually powered pallet jack. In some embodiments, the drive axle and a steering axle, supporting the left and right steering wheels, may be located in a same vertical plane. Additionally or alternatively, the drive axle may be located under a hydraulic cylinder used to lift the pallet load. And further, a vertical axis, about which the steering axle rotates during steering, may pass through a center of the drive axle. The drive axle supporting the drive wheel may be carried by a drive wheel arm, which pivots with respect to the frame. A biasing device or member, such as a spring, may be used to provide a downward force against the drive wheel arm, to force the drive wheel against the floor or other supporting surface. Such force increases friction between the drive wheel and the floor, thereby reducing slippage between the drive wheel and the floor.

The discussion herein includes several sections. Each section is intended to be non-limiting. Further, this entire description is intended to illustrate components which may be utilized in a pallet jack power assembly, but not components which are necessarily required. The discussion begins with a section entitled "Pallet Jack Power Retrofit," which describes one environment that may implement the techniques described herein. This section describes a pallet jack power assembly that may be added or "retrofit" to an existing manually powered pallet jack. A second section entitled "Power Train," describes aspects of power generation, gearing and delivery, and provides an example of power delivery to a single drive wheel. A third section, entitled "Drive Wheel Traction Assembly," describes example techniques that may be used to bias the drive wheel downwardly, and techniques which allow selection of a drive wheel size suited for a particular application. A fourth section, entitled "Example Design," provides a further example which integrates the concepts discussed in the prior sections into an example design. Additionally, aspects of an optional auxiliary drive wheel are discussed. Finally, the discussion ends with a brief conclusion.

This brief introduction, including section titles and corresponding summaries, is provided for the reader's convenience and is not intended to limit the scope of the claims or any section of this disclosure.

Pallet Jack Power Retrofit

FIG. 1A is a perspective view of an example pallet jack 102. The pallet jack 102 includes a frame 104 from which extend a right fork 106 and a left fork 108. The forks are shown in truncated fashion, to save drawing space. The pallet jack 102 includes a right steering wheel (not shown) and a left steering wheel 110. A hydraulic jacking or lifting cylinder 112 is operated by manual movement of the arm 114, typically by an operator holding onto the handle 116. Operation of the hydraulic jacking or lifting cylinder 112 lifts a pallet with load carried by the forks 106, 108. The cylinder 112 releases pressure in response to operation of the release lever 118.

Figure 1B:
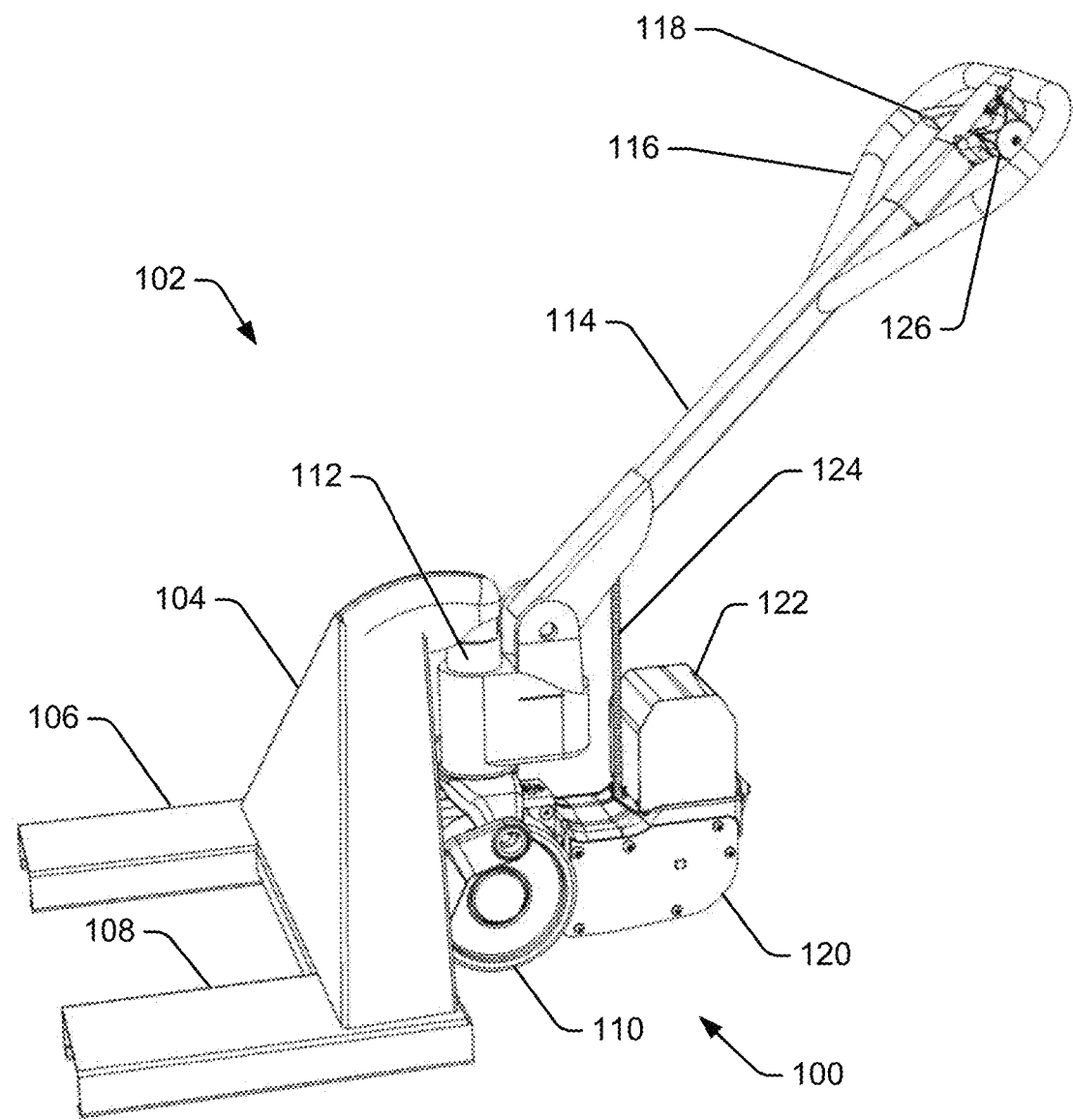
FIG. 1B is a perspective view of a manually powered pallet jack having an example of a pallet jack power assembly installed thereon. Unless otherwise noted, as used hereinafter, the term "pallet jack" refers to a manually powered pallet jack.

FIG. 1B is a perspective view of an example pallet jack 102 having an example of a pallet jack power assembly 100 installed thereon. The example pallet jack power assembly 100 shown in FIG. 1B provides an enclosure 120, within which a motor, power train, drive wheel traction assembly and other components are configured. A battery pack 122 or other power supply is located above or within the enclosure. A cable 124 and control 126 allows the user to operate the pallet jack power assembly 100 while holding the handle 116.

Figure 2:
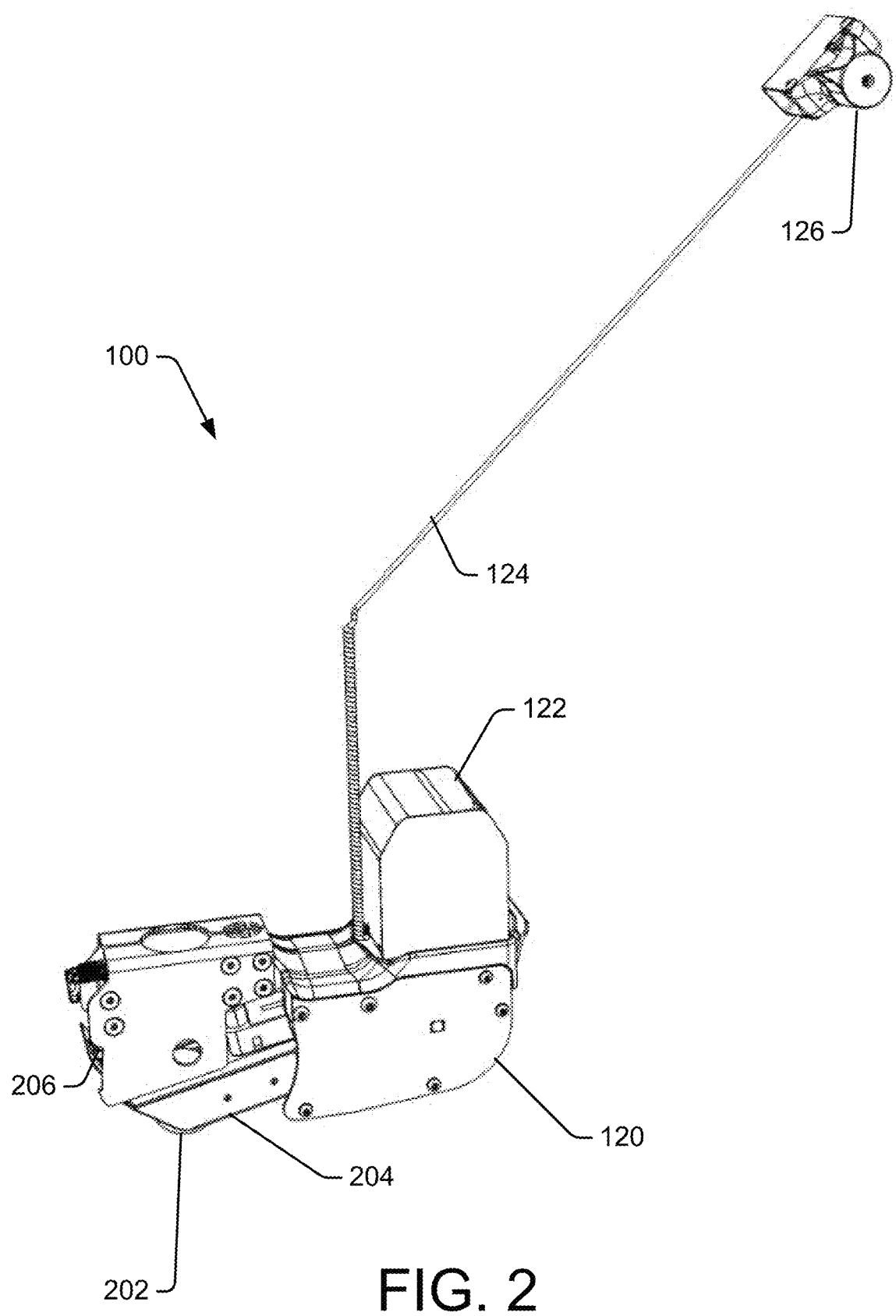
FIG. 2 is a perspective view of the pallet jack power assembly of FIG. 1B apart from the pallet jack.

FIG. 2 is a perspective view of the pallet jack power assembly 100, with the pallet jack removed, and with some enclosure surfaces of the pallet jack power assembly removed to reveal inner components. This view again illustrates the enclosure 120 and battery pack 122. The cable 124 and control 126 allows the user to control the pallet jack power assembly 100 from a convenient location, such as the handle of the pallet jack.

FIG. 2 also illustrates an example of a drive wheel 202, supported by a drive axle (not shown), which is in turn carried by a drive wheel arm 204. The drive wheel arm 204 is pivotable relative to the frame 104 of the pallet jack power assembly to allow the drive wheel 202 to move up and down over uneven terrain, and to allow a downward force to be applied. In the example of FIG. 2, the drive wheel arm 204 is biased downwardly by the spring 206 (partially hidden by a forward portion of the enclosure 120), which is interposed between the frame 104 of the pallet jack power assembly and the drive wheel arm 204. The spring may be based in technologies including coiled metal, hydraulic, pneumatic, etc. The downward force applied by the spring 206 to the drive wheel arm 204 may cause the drive wheel arm to pivot somewhat. Moreover, the downward force on the drive wheel arm 204 forces the drive wheel 202 against the floor, to thereby increase friction while allowing the drive wheel 202 to ride up over irregularities in the terrain.

Figure 3:
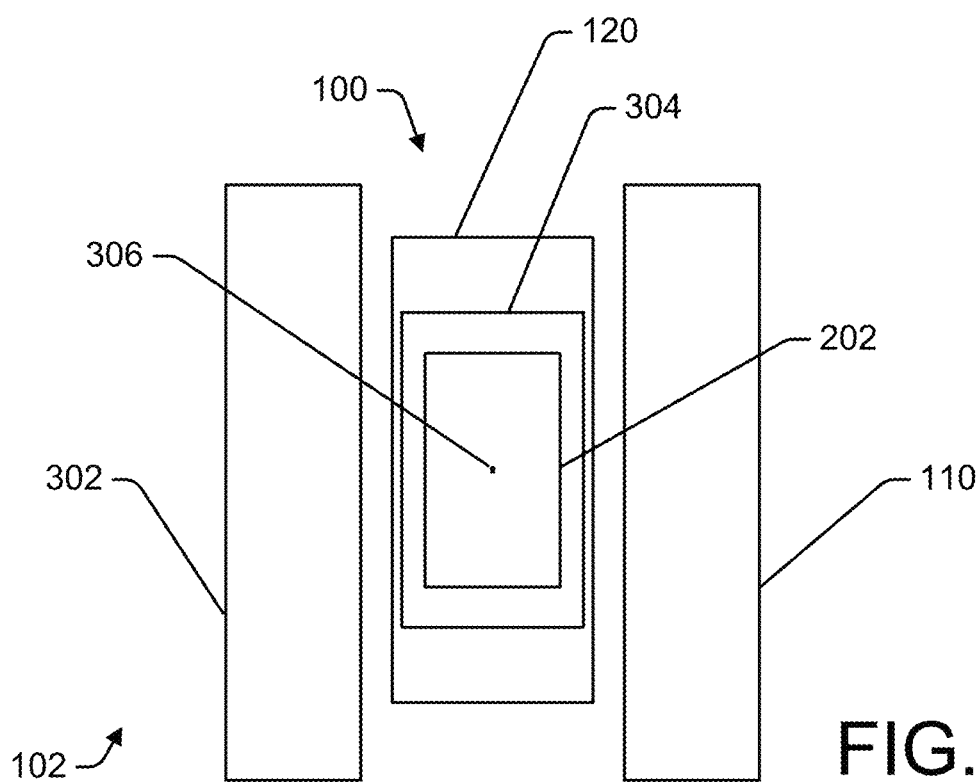
FIG. 3 is a schematic diagram, showing a simplified bottom view of the pallet jack having the example of the pallet jack power assembly installed thereon, particularly showing the steering wheels of the pallet jack and a drive wheel of the pallet jack power assembly appearing through an opening defined in an enclosure of the pallet jack power assembly.

FIG. 3 is a diagram, showing a bottom view of the pallet jack 102 having the example of the pallet jack power assembly 100 installed thereon. In the bottom view of FIG. 3, the left steering wheel 110 appears on the right, and the right steering wheel 302 appears on the left. An opening 304 is defined in a bottom portion of the enclosure 120, and is sized to allow the drive wheel 202 to extend from the enclosure 120 to contact the floor. During operation, the steering wheels 110, 302 and the drive wheel 202 turn in response to movement of the arm 114 and handle 116 (FIG. 1) about a common steering axis 306 extending into the page in FIG. 3. Thus, all or part of the pallet jack power assembly 100, particularly including the drive wheel 202, may pivot with the steering wheels as they are turned by an operator. Additionally, driven rotation of the drive wheel 202 provides a motive force to the pallet jack. The steering wheels 110, 302 are non-driven, and may rotate passively when they are in contact with the ground.

Power Train

Figure 4:
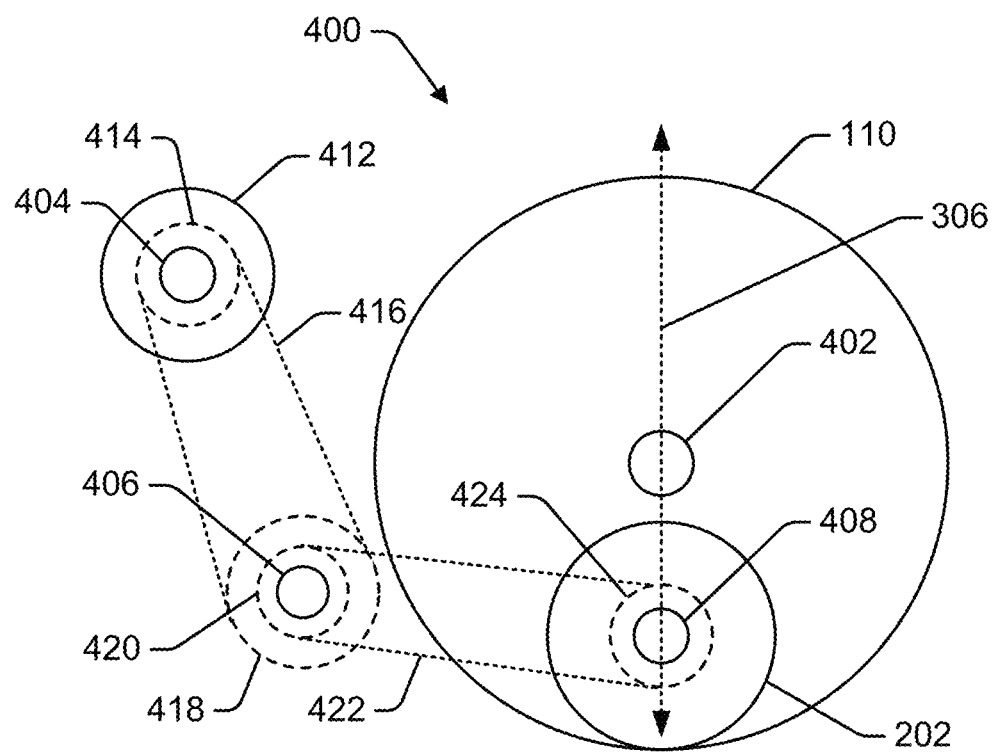
FIG. 4 is a schematic diagram illustrating one example of a power train, showing a motor axle, gear axle, drive axle and one of the steering wheels and the steering axle.

FIG. 4 is a diagram illustrating one example of a power train 400. In different embodiments of the pallet jack power assembly, the power train provides power to the drive wheel by operation of a motor and/or transmission means, such as chain drive, belt drive, shaft drive or other power transmission means. The power train may or may not use gears, pulleys or other mechanisms to achieve a desired range of power and drive speeds. The power train may in some embodiments include a multi-speed or continuously variable transmission.

In the example power train 400 of FIG. 4, a steering axle 402, a motor axle 404, a gear axle 406 and a drive axle 408 are shown. Only one steering wheel 110 (FIG. 1) of the two that would exist is shown supported by the steering axle 402, to provide a view of the drive wheel 202. The steering axis 306 provides a reference, showing that the drive axle 408 is in a same vertical plane as the steering axle 402. Moreover, a center of the steering axle 402 and a center of the drive axle 408 may be located along the steering axis 306. In the example of FIG. 4, portions of the pallet jack power assembly 100, including the drive wheel 202, pivot about the steering axis 306, in response to a user turning the steering wheels.

The motor axle 404 carries the motor 412. While different configurations are possible, the motor 412 may be configured to rotate about the motor axle 404, which may be held in a fixed relationship to a supporting frame of the pallet jack power assembly. For example, an extension or portion of frame 104 (of FIG. 1) may hold either the motor axle 404 or the motor 412 fixed, thereby allowing the other to rotate. In either embodiment, the rotating member may rotate a sprocket 414. In the embodiment of FIG. 4, wherein the motor 412 turns about a fixed motor axle 404, the sprocket 414 may be attached to the motor 412 for rotation. A chain 416 is driven by the motor sprocket 414, and provides power to the gear axle 406.

The gear axle 406 includes a sprocket 418 driven by the motor 412 and chain 416. Rotation of the gear axle 408 drives sprocket 420 that in turn powers the drive chain 420. The drive chain 420 powers a sprocket 424 of the drive axle 408, thereby providing power to the drive axle and drive wheel 202.

Figure 5:
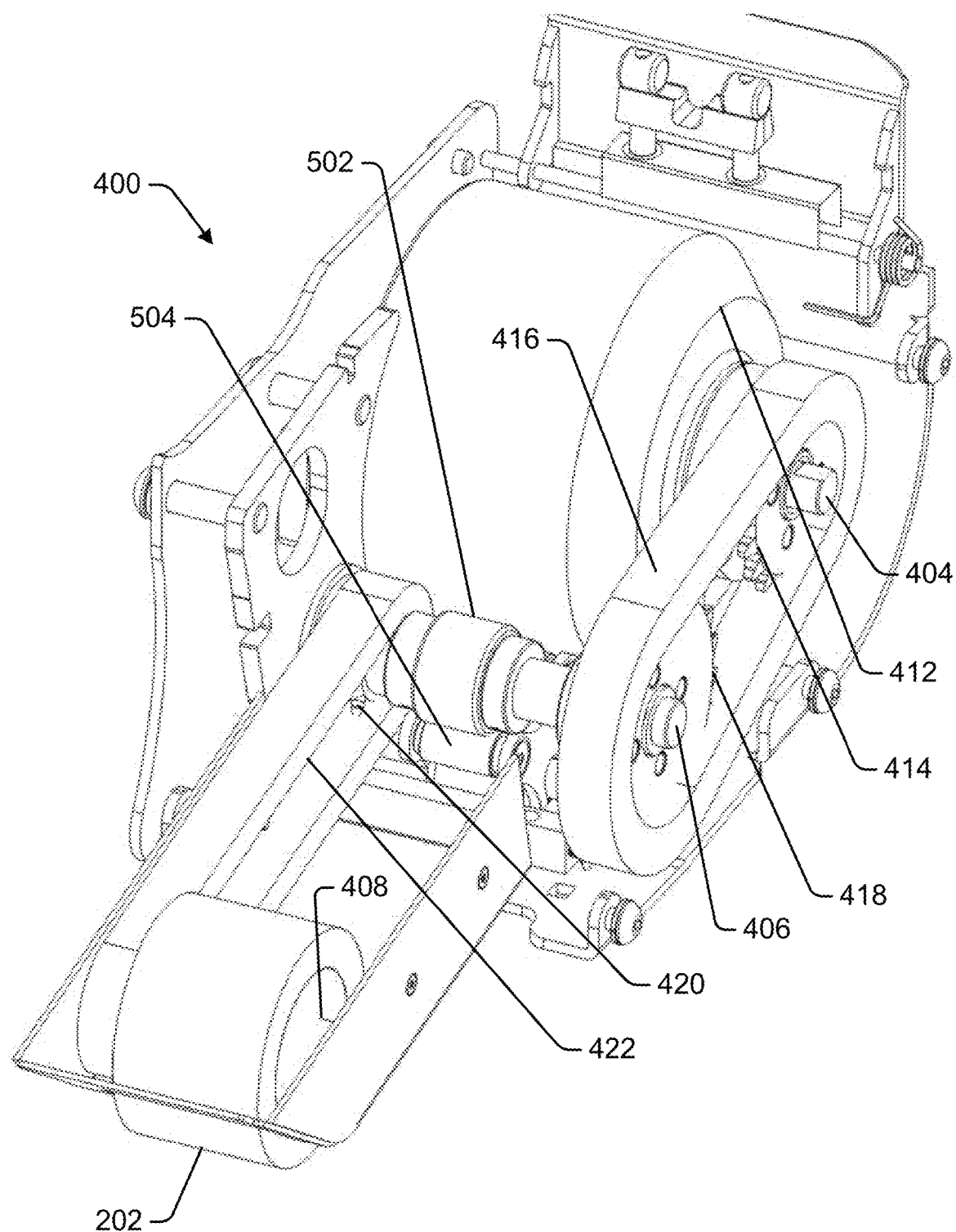
FIG. 5 is a perspective view of an example configuration of the motor, power train and drive wheel.

FIG. 5 is a perspective view of an application of the power train 400. The perspective view of FIG. 5 shows the motor axle 404, which may be fixed. The motor 412 rotates about the axle motor 404, which rotates the sprocket 414. Rotation of the sprocket 414 drives chain 416, which in turn rotates the sprocket 418 and gear axle 406. Rotation of the gear axle 406 rotates sprocket 420, which in turn drives chain 422. Chain 422 drives a sprocket (not seen in FIG. 5, but shown as 424 in FIG. 4) which drives the drive wheel 202 about drive axle 408.

Rotation of the gear axle 406 rotates frictional surface 502, which in turn rotates one or more rollers 504. Rollers 504 drive an auxiliary drive wheel best seen in FIGS. 10-12, which will be described with reference to those figures.

Figure 6:
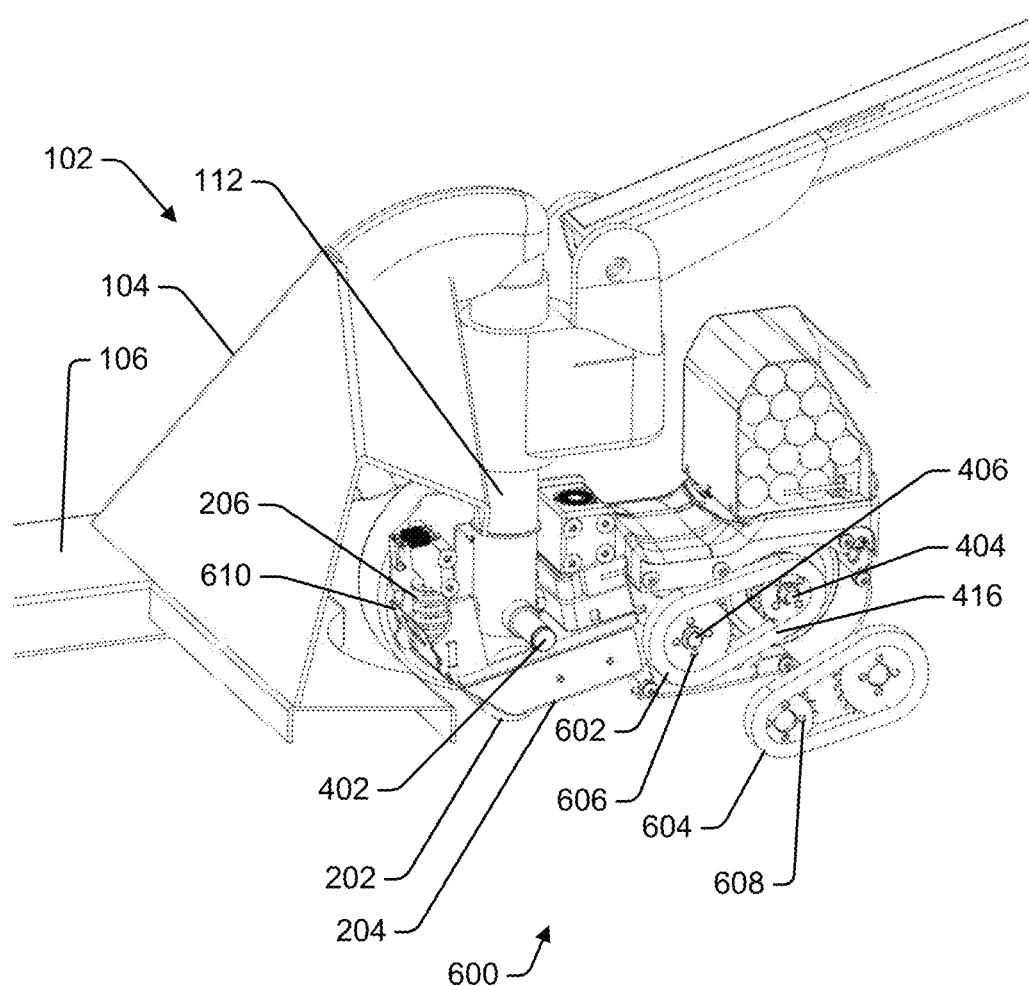
FIG. 6 is a perspective view showing an example of alternative gears for use in the power train and also showing an example of the drive wheel traction assembly.

FIG. 6 is a perspective view showing an example power train 600 having adjustable gear ratios. This view shows additional details of the motor axle 404 and gear axle 406.

A sprocket set 602 includes first and second sprockets both attached to chain 416. The sprocket set 602 is reversible and/or replaceable, such as by a second sprocket set 604. Selecting, reversing and/or replacing sprocket sets provides a method by which a desired higher or lower gear ratio may be obtained, typically without the use of difficult to operate tools. By reversing the sprocket set 602, the sprocket that was on the motor axle 404 would be put on the gear axle 406, and the sprocket that was on the gear axle 406 would be put on the motor axle 404. The sprocket set 602 may be removed by pulling the sprockets off pins 606. The removed sprocket set 602 may be reversed, so that each of the two sprockets in the sprocket set is attached to an axle (404, 406) to which the other sprocket was previously attached. Alternative, the sprocket set 602 may be replaced with a different sprocket set 604. The holes 608 of a sprocket set to be installed are then passed over the pins 606, thereby installing the sprocket set. Because reversing the locations of sprockets in a sprocket set does not alter center distances between the motor axle 404 and gear axle 406, and because the same sprockets can be used, the same or original chain can also be used. Accordingly, no new or additional parts are required to change the gear ratio of the example power train 600. This advantageously allows the speed vs. torque ratio to be selected to suit different applications requirements.

Drive Wheel Traction Assembly

FIG. 6 also shows additional details of an example of a drive wheel traction assembly. In one example, a spring 206 or other biasing device provides a downwardly directed force against the drive wheel arm 204, which may pivot with respect to fixed points on the frame 104 of the pallet jack power assembly. For example, the drive wheel 202 may be moved further or closer to the steering axle 402. Therefore, the biasing device provides a downward force to the drive wheel arm 204, resulting in increased friction between the drive wheel 202 while allowing the drive wheel to traverse an uneven supporting floor surface.

In the example of FIG. 6, the spring 206 may be replaced with a different spring having a different spring constant, to thereby change the downward biasing force applied to the drive wheel. For example, when using the pallet jack for light loads, a strong downward bias may cause the drive wheel to be forced downwardly to the extent that the steering wheels 110, 302 do not touch the floor. Accordingly, a weaker spring may be desirable for lighter loads to achieve better performance. In contrast, when using the pallet jack for heavy loads, a weak downward bias may not result in sufficient friction between the drive wheel and the floor. Accordingly, a stronger spring may be desirable. In the example of FIG. 6, a latch 610 may be used to release the drive wheel arm 204, allowing it to pivot sufficiently to remove and replace the spring.

Figure 7:
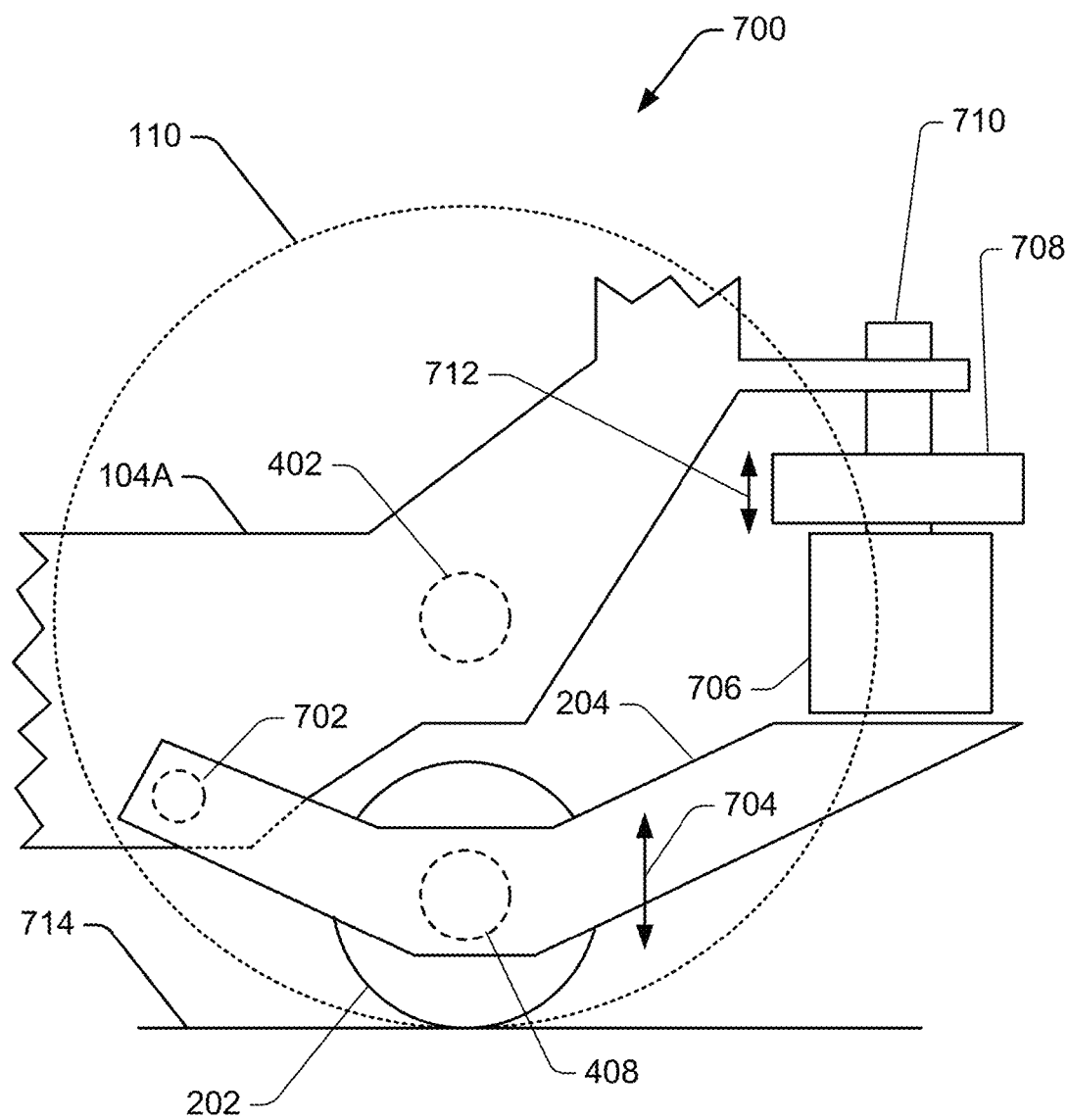
FIG. 7 is a schematic diagram showing a simplified side orthographic view of an example of the drive wheel traction assembly.

FIG. 7 is a diagram showing portions of a pallet jack and portions of a second example of a drive wheel traction assembly 700. The pallet jack includes a steering wheel 110 and drive wheel 202. The drive wheel traction assembly 700 provides a controllable downward bias to the drive wheel 202, thereby allowing the weight applied to the drive wheel and the steering wheels to be balanced. In the example shown, a portion 104A of the frame 104 (e.g., FIG. 1) of the pallet jack supports the drive wheel arm 204 and the steering axle 402. The drive wheel arm 204 pivots with respect to the frame 104A at pivot 702, thereby allowing the drive axle 408 and drive wheel 202 to be moved up or down as indicated at 704. A spring 706 or other biasing device may be used to apply a downward force against the drive wheel arm 204. Thus, the spring 706 or other biasing member may be interposed between the frame 104A and the drive wheel arm 204, to bias the drive wheel arm away from the frame and/or to bias the drive wheel 202 in a generally downward direction. The spring 706 limits a load carried by the drive wheel 202. In particular, if additional load is put onto the pallet jack, it will be carried by the two steering wheels; additional load is not carried by the drive wheel because a greater upward force would simply compress the spring. In this example, the spring 706 is maintained in compression. Compression on the spring 706 may be regulated by rotation of a nut 708 on bolt 710. Thus, the nut 708, or other retainer or control, may regulate or control resistance or stiffness (e.g., energy, tension, compression, etc.) of the spring 706 and control vertical movement of a steering wheel support bracket with respect to a drive wheel support bracket. By rotating the nut 708 in a desired direction, the nut may be moved in either direction 712, thereby controlling compression of the spring 706 and controlling the downward bias on the drive wheel arm 204. Accordingly, a force applied by the drive wheel 202 on the floor 714 may be controlled, which regulates traction of the drive wheel.

Figure 8:
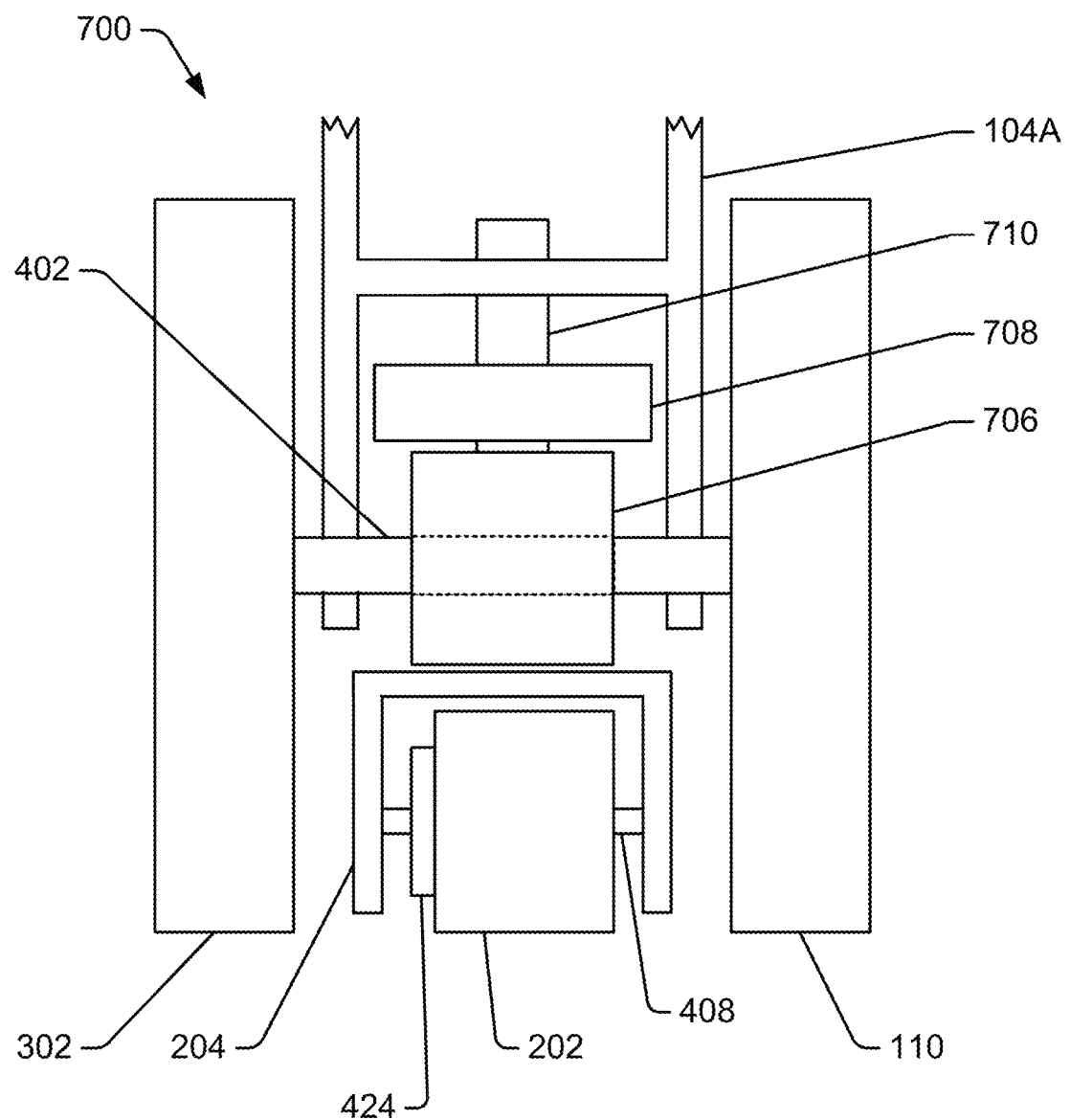
FIG. 8 is a schematic diagram showing a simplified front orthographic view of an example drive wheel traction assembly, wherein the drive wheel is entirely below the steering axle.

FIG. 8 is a diagram showing a front orthographic view of the example drive wheel traction assembly 700. The steering wheels 110, 302 are supported by the steering axle 402, which is supported by frame element 104A. The drive wheel 202 is supported by the drive axle 408, which is supported by the drive wheel arm 204. In the example shown, the drive wheel 202 has a diameter less than a radius of the steering wheels 110, 302. Thus, the drive wheel is entirely below the steering axle. The sprocket 424 is fastened to the drive wheel, and controls its rotation. The spring 706 applies a biasing force to the drive wheel arm 204, to regulate friction between the drive wheel 202 and the floor. In this example, compression of the spring is controlled by a position of nut 708 on bolt 710, which is secured by frame element 104A. The drive wheel arm 204 may pivot with respect to the frame element 104A, depending on tension on the spring 706, weight of a load on the pallet jack, unevenness of the floor and/or other factors.

In the example drive wheel traction system 700 of FIGS. 7 and 8, the drive wheel 202 is entirely below the steering axle 402. Accordingly, the drive wheel 202 has a diameter less than a radius of the left and right steering wheels. Moreover, the drive axle is located under the steering axle. In some applications, this is advantageous, since a conventional pallet jack may require little or no modification to install the pallet jack power assembly if the drive wheel of the pallet jack power assembly is sized to fit under the axle of the steering wheels of the pallet jack.

Figure 9:
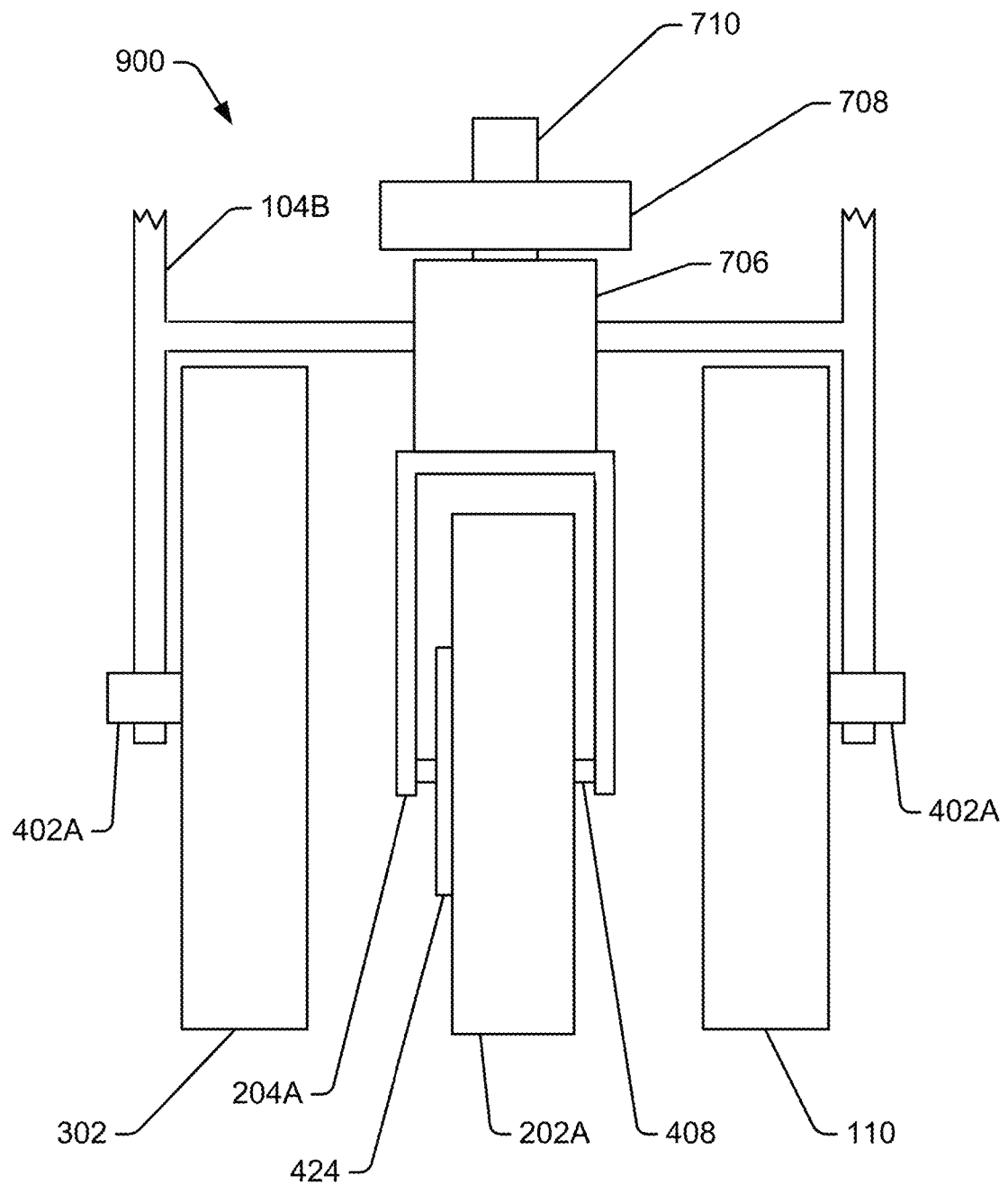
FIG. 9 is a schematic diagram showing a simplified front orthographic view of another example drive wheel traction assembly, wherein an upper portion of the drive wheel is above the steering axle.

FIG. 9 is a diagram showing a front orthographic view of a further example drive wheel traction assembly 900, which employs a larger drive wheel. The steering wheels 110, 302 are supported by the steering axle 402A, which is supported by frame element 104B. The steering axle in this embodiment is compound, being formed by similar left and right portions. The left portion holds the left steering wheel in position, while the right portion holds the right steering wheel in place. The drive wheel 202A is supported by the drive axle 408, which is supported by the drive wheel arm 204A. In the example shown, the drive wheel 202A has a diameter greater than a radius of the steering wheels 110, 302. Thus, a top portion of the drive wheel is above the steering axle. The sprocket 424 is fastened to the drive wheel, and controls its rotation. The spring 706 applies a biasing force to the drive wheel arm 204A, to regulate friction between the drive wheel 202 and the floor. In this embodiment, compression of the spring is controlled by a position of nut 708 on bolt 710, which is secured by frame element 104A. The drive wheel arm 204 may pivot with respect to the frame element 104A, depending on tension on the spring 706, weight of a load on the pallet jack, unevenness of the floor and/or other factors.

In the example drive wheel traction system 900 of FIG. 9, an upper portion of the drive wheel 202A is above the steering axle 402A. That is, a diameter of the drive wheel 202A may be larger than a radius of the steering wheels 110, 302. In some applications, a drive wheel that is large enough that an upper portion of the drive wheel is above the steering axle is advantageous, since a drive wheel that is as large, nearly as large, or even larger than the steering wheels, all suggested by FIG. 9, may provide better traction, handling or other characteristics than a smaller drive wheel.

Example Design

Figure 10:
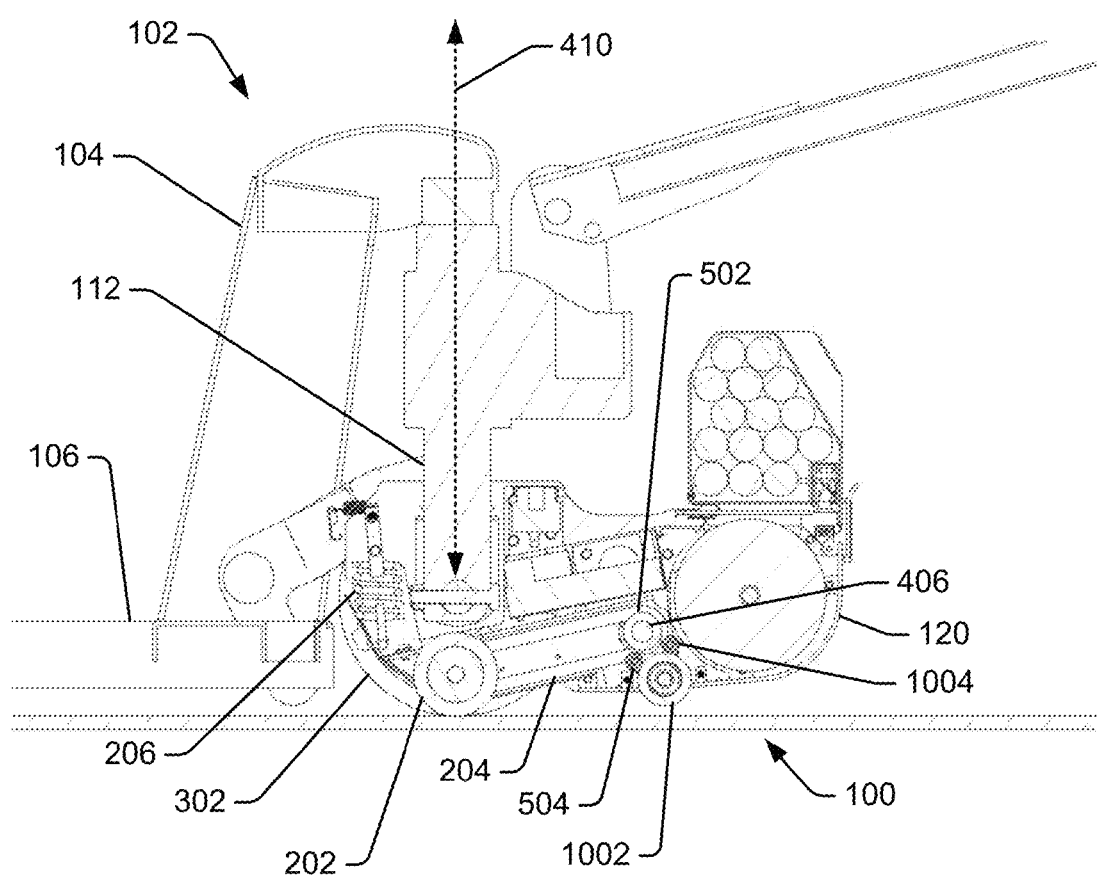
FIG. 10 is a sectional view of an example design of a pallet jack power assembly, showing the drive wheel and showing a steering wheel in contact with the floor, indicating that the pallet has sufficient load to overcome a downward bias applied to the drive wheel.

FIG. 10 is a sectional view of an example design of a pallet jack power assembly installed on an example pallet jack. In the sectional view, the left side of the enclosure and left steering wheel are not shown, thereby revealing the drive wheel and the right steering wheel. Additionally, in this view, the pallet jack is assumed to have sufficient load to have overcome the bias of the spring, and to thereby lower the steering wheels to the floor, allowing them to support significant portions of the load.

Referring to FIG. 10, the pallet jack 102 includes a frame 104 and fork 106. The hydraulic jacking cylinder 112 has lifted the fork 106 slightly off the ground. Accordingly, weight from the load has compressed spring 206, thereby lowering the steering wheel 302 to touch the floor and causing it to carry weight. As the spring 206 compresses, the drive wheel arm 204 pivots with respect to the enclosure 120 of the pallet jack power assembly 100 and with respect to the pallet jack 102.

The drive wheel 202, the steering wheel 302 (and steering wheel 110, not shown in this view) and the hydraulic cylinder 112 are all rotatable about a same vertical steering axis 306. That is, when the pallet jack 102 is steered, the center of the steering axle and the center of the drive axle rotate about the steering axis 306. Advantageously, this tends to position the load on both the steering wheels 110, 302 and the drive wheel 202 and to minimize resistance of the drive wheel to turning (due to friction). Moreover, the drive wheel 202 and supporting drive axle are located below the hydraulic or jacking cylinder 112 of the pallet jack 102 upon attachment of the pallet jack power assembly 100 to the pallet jack.

FIG. 10 also illustrates an auxiliary drive wheel 1002. In the example shown, a lower perimeter of the auxiliary drive wheel 1002 protrudes from a housing 120 of the pallet jack power assembly 100 and is elevated or suspended above the floor. That is, it has a lower perimeter that is elevated or located above a lower perimeter of the left and right steering wheels. Accordingly, the auxiliary drive wheel 1002 is not effective until an obstruction, slope, curb, rough surface, etc., is encountered. The auxiliary drive wheel 1002 may have a lower perimeter protruding from the housing 120 of the pallet jack power assembly 100, which may be elevated above a lower perimeter of the left and right steering wheels 110, 302, such that the auxiliary drive wheel is suspended above the ground when the pallet jack is on a flat surface, but comes into contact with the ground when the steering wheels and/or drive wheel fall into a depression of an uneven surface.

Thus, the auxiliary drive wheel 1002 may be operational when the pallet jack 102 and pallet jack power assembly 100 encounter rough or uneven surfaces, such as a depression, an incline or a curb. In such circumstances, the auxiliary drive wheel 1002 may contact the floor and/or curb, and would assist in moving the pallet jack. In particular, the auxiliary drive wheel 1002 may drive the pallet jack 102 along the floor even though the drive wheel 202 may no longer be in contact with the floor and/or have sufficient traction/friction to move the load. Upon contact with the floor, the auxiliary drive wheel 1002 and the rollers 504, 1004 travel upward, until the rollers make contact with the frictional surface 502. In one example, the auxiliary drive wheel and rollers travel according to movement allowed by slots through which their respective axles pass. As seen in FIG. 5, rotation of the gear axle 406 rotates frictional surface 502, which in turn rotates rollers 504, 1004 when the rollers are in an elevated position, such as in response to contact between the auxiliary drive wheel 1002 and the floor. The rollers 504, 1004 then drive the auxiliary drive wheel 1002 in the same direction as the drive wheel 202.

Figure 11:
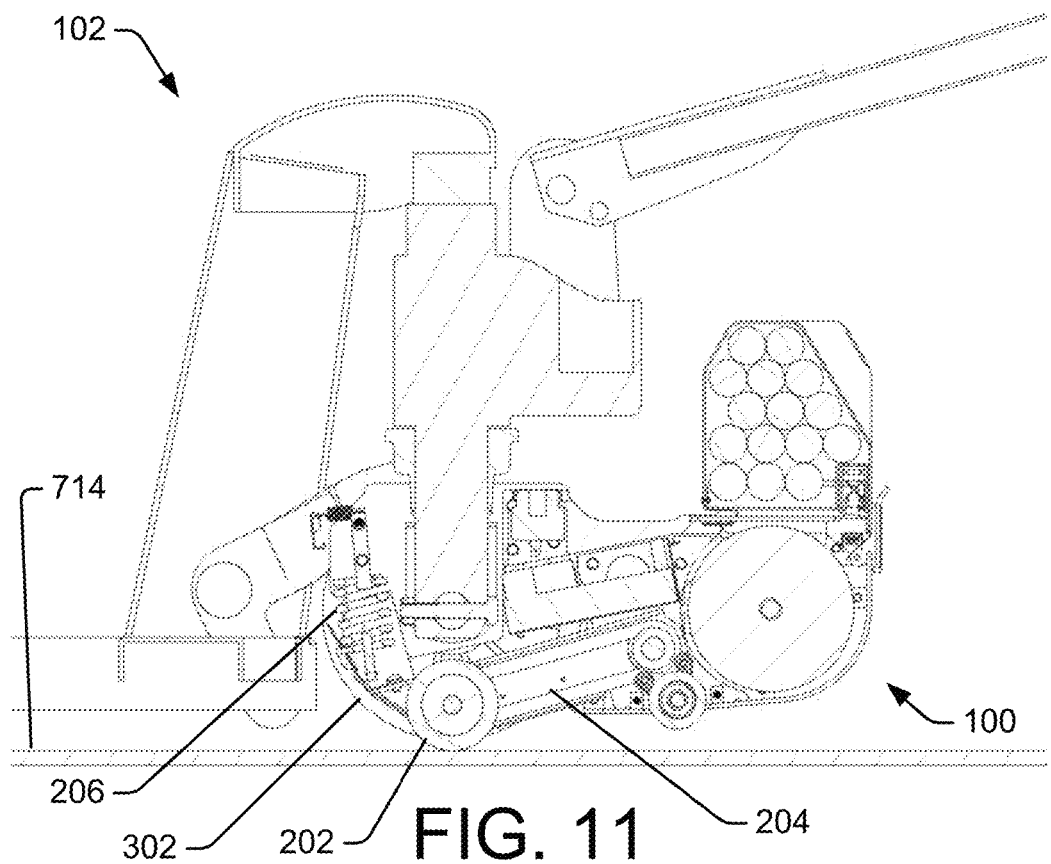
FIG. 11 is a sectional view of an example design of a pallet jack power assembly, wherein the steering wheels are lifted off the floor, such as when a load is insufficient overcome the bias of the drive wheel traction assembly.

FIG. 11 is similar to the view of FIG. 10. However, a light load (or no load) has allowed spring 206 to lengthen. As a result, the drive wheel arm 204 pivots slightly, allowing the drive wheel 202 to move downwardly. This movement raises the steering wheels 302 (and 110, not shown) off the floor 714.

Figure 12:
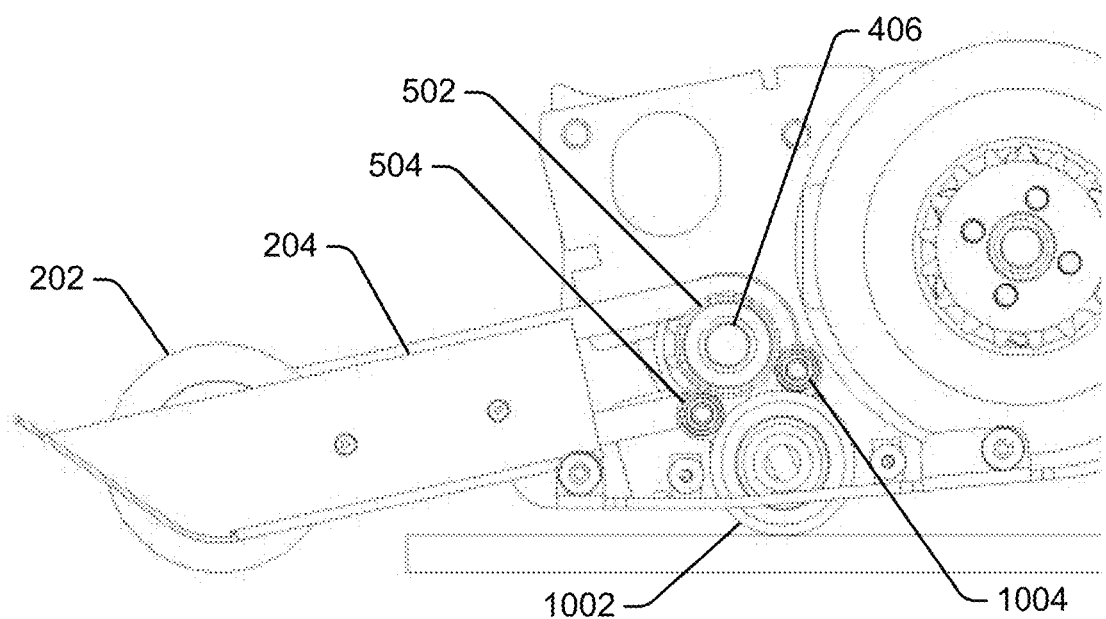
FIG. 12 is a sectional view of an example design of a pallet jack power assembly, particularly showing structure and operation of an auxiliary drive wheel.

FIG. 12 is a sectional view of an example design of a pallet jack power assembly, particularly showing structure and operation of an auxiliary drive wheel 1002. The auxiliary drive wheel 1002 may be operable when the floor is uneven and/or when a curb is encountered. The auxiliary drive wheel 1002 is operable with any sized drive wheel 202. However, smaller drive wheels may benefit from synergistic interaction with the auxiliary drive wheel 1002, in that one drive wheel is operable when the other may not be operable. In the example shown, a curb or bump contacts the auxiliary drive wheel 1002. The auxiliary drive wheel 1002 assists to propel the pallet jack over the curb, particularly helping when the drive wheel 202 encounters or drops off the curb. Thus, the auxiliary drive wheel 1002 may help the pallet jack "bump" up or down a curb or rough spot in the floor or pavement.

Example Larger Drive Wheel Design

FIGS. 13-27 show examples of the larger drive wheel pallet jack, an additional example of which is shown in FIG. 9. A pallet jack may include a forked frame sized to move into and/or under pallets, left and right steering wheels and a jacking cylinder. A drive wheel may be located between the left and right steering wheels, and may receive power from a motor. The motor may be a hub motor, located within the drive wheel, or the motor may be located externally to the drive wheel. In a first example, a center of each of the steering wheels and a center of the drive wheel located in a co-planar orientation, thereby providing stability and weight-supporting advantages. In second example, a spring biases the drive wheel into the floor, thereby elevating the steering wheels off the floor in light-load conditions and maintaining sufficient friction between the drive wheel and the floor. In a third example, a nut or fastener may be withdrawn from the spring, thereby removing the bias of the drive wheel into the floor, allowing the drive wheel to be lifted off the floor for manual operation of the pallet jack. In a fourth example, fasteners may attach or release the drive wheel and the motor from the pallet jack. Thus, the pallet jack may be converted between power-assisted and manual operation.

Figure 13:
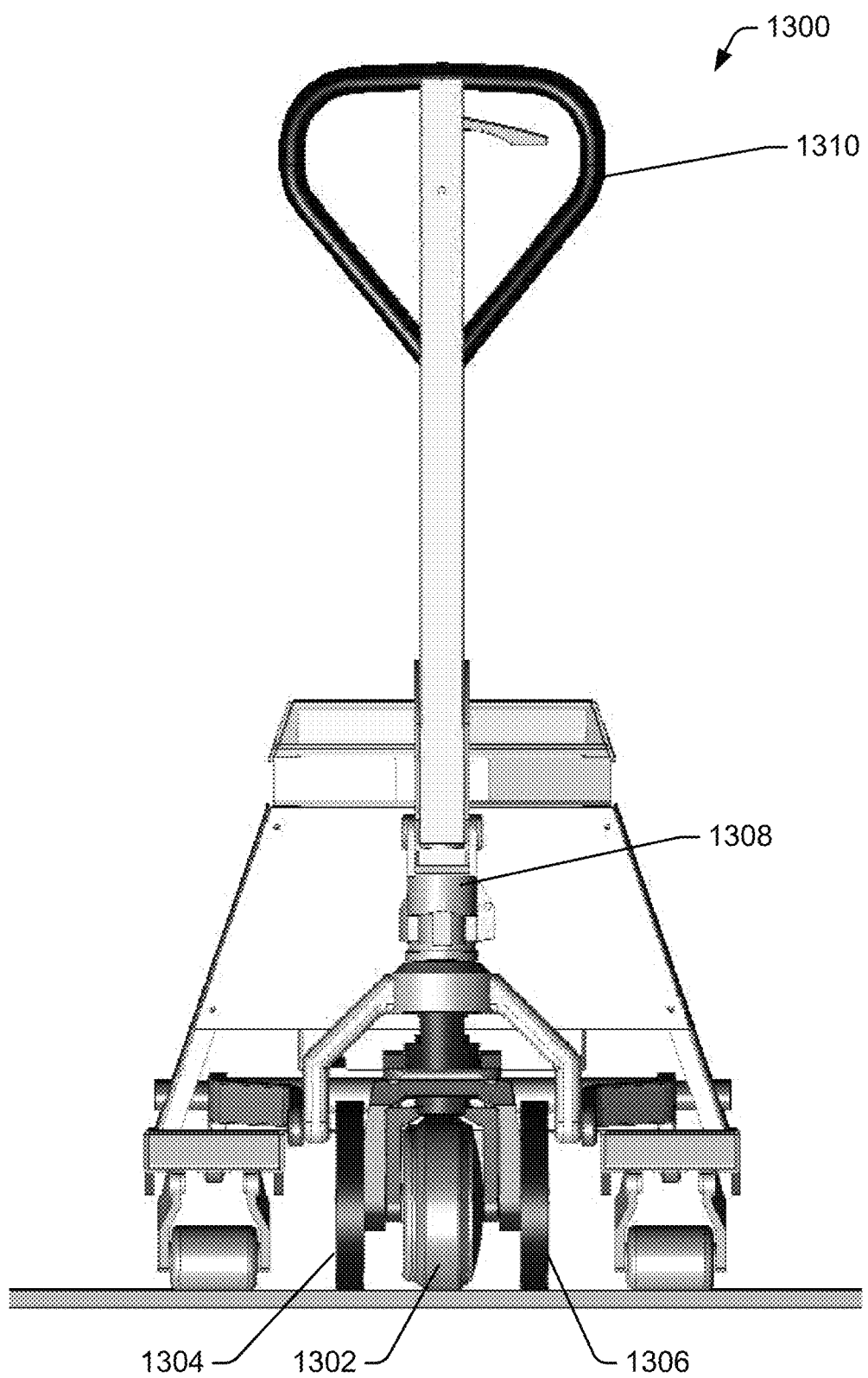
FIG. 13 is a rear orthographic view of a further example of a pallet jack, having a drive wheel with a radius larger than the radius of the left and right steering wheels.

FIG. 13 shows example of pallet jack 1300, having a drive wheel 1302 with a diameter larger than the radius of a left steering wheel 1304 and a right steering wheel 1306. An axle of the drive wheel may be oriented perpendicular to, and/or in the same plane as, the jacking or lifting cylinder. The drive wheel may be located between the left and right steering wheels, to position a center of each of the steering wheels and a center of the drive wheel in a same vertical plane. The axle of the drive wheel may also be coplanar with the axles of the steering wheels. A motor may provide power to the drive wheel, and may be located internally to the drive wheel, or may be located externally to the drive wheel and connected by a drive chain, drive line, etc. A jacking or lifting cylinder 1308 may be located above the drive wheel 1302. A handle 1310 allows a user to steer, pull and stop the pallet jack. The handle 1310 also allows the user to elevate the pallet jack to lift a load, using the jacking or lifting cylinder 1308. The handle 1310 also allows the user to lower the load by operation of a release lever carried by the handle.

Figure 14:
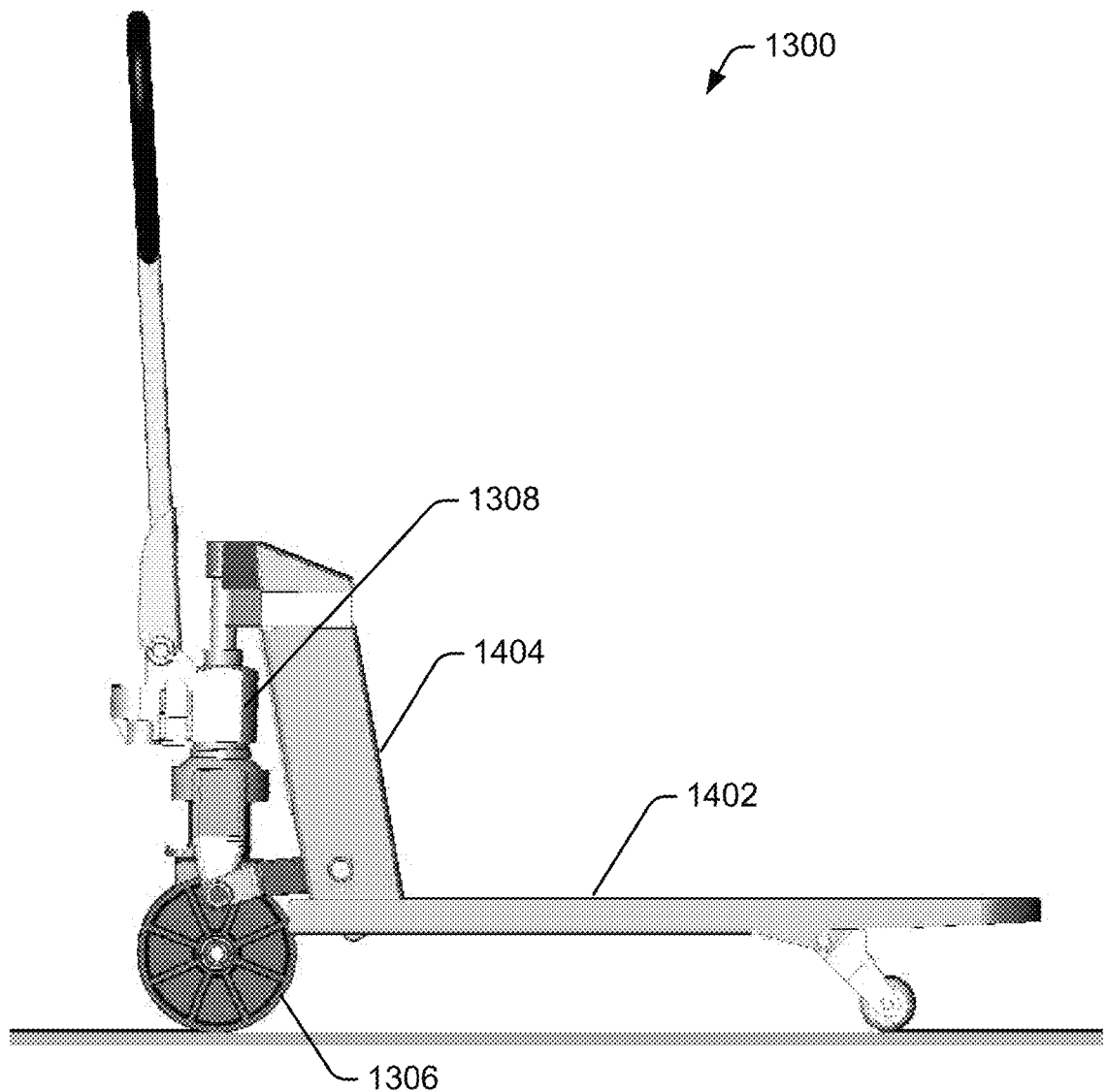
FIG. 14 is a side orthographic view of a pallet jack of FIG. 13.

FIG. 14 shows the example pallet jack 1300, including a forked frame 1402 having left and right forks or tines that may be moved to a location under a load supported by a pallet. A battery pack 1404 provides current to a motor powering the drive wheel.

Figure 15:
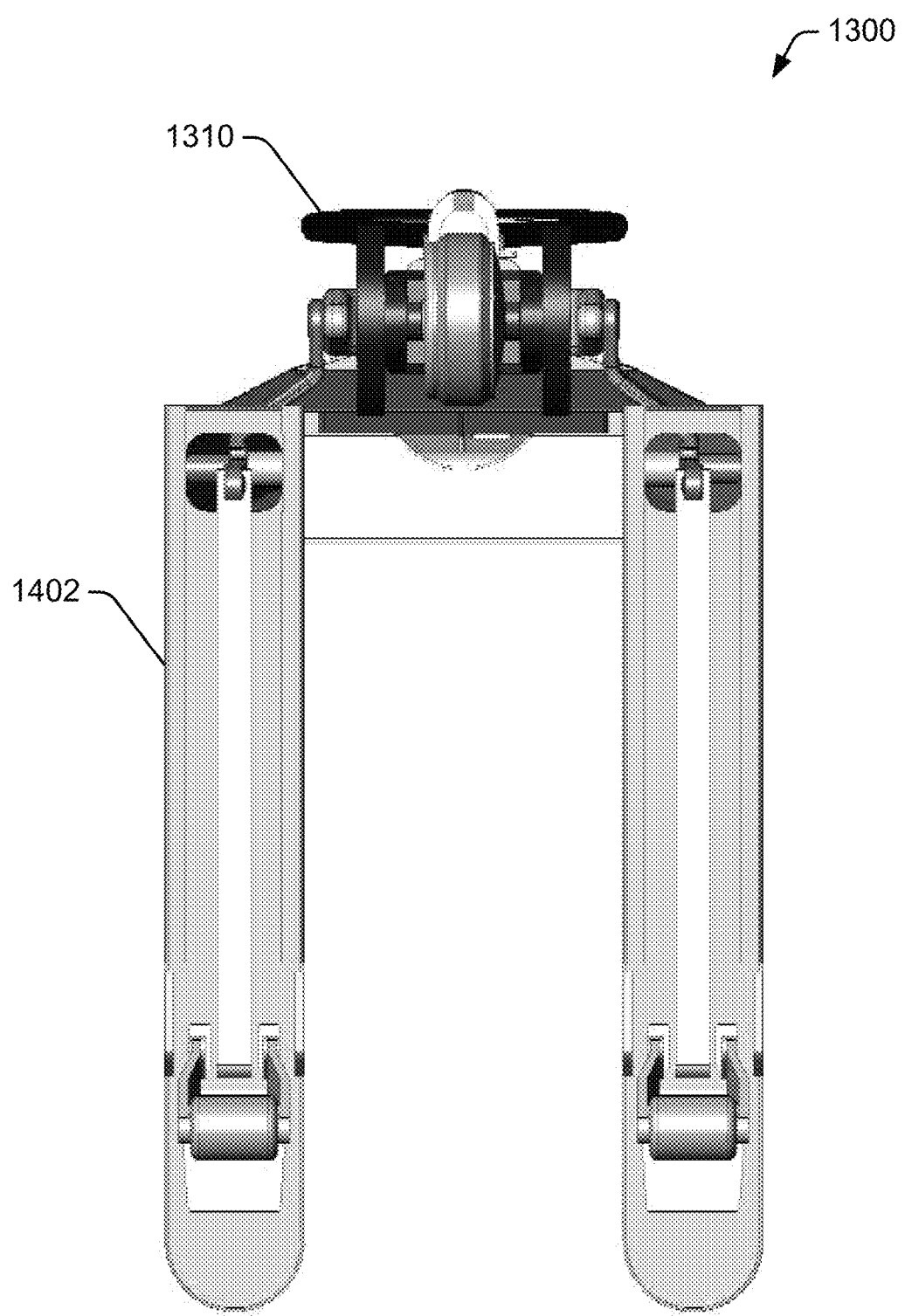
FIG. 15 is a top orthographic view of the pallet jack of FIG. 13.

FIG. 15 shows the example pallet jack 1300, including a view of the forked frame 1402 and the handle 1310 in an upright position. The forked frame may be supported at least in part by left and right steering wheels.

FIGS. 16 through 20 show examples of a power and steering assembly 1600, which are representative of such assemblies that may be used in the pallet jack 1300. In the examples shown, an axle of each of the steering wheels and an axle of the drive wheel may be co-planar, typically in a plane that is perpendicular to the floor.

Figure 20:
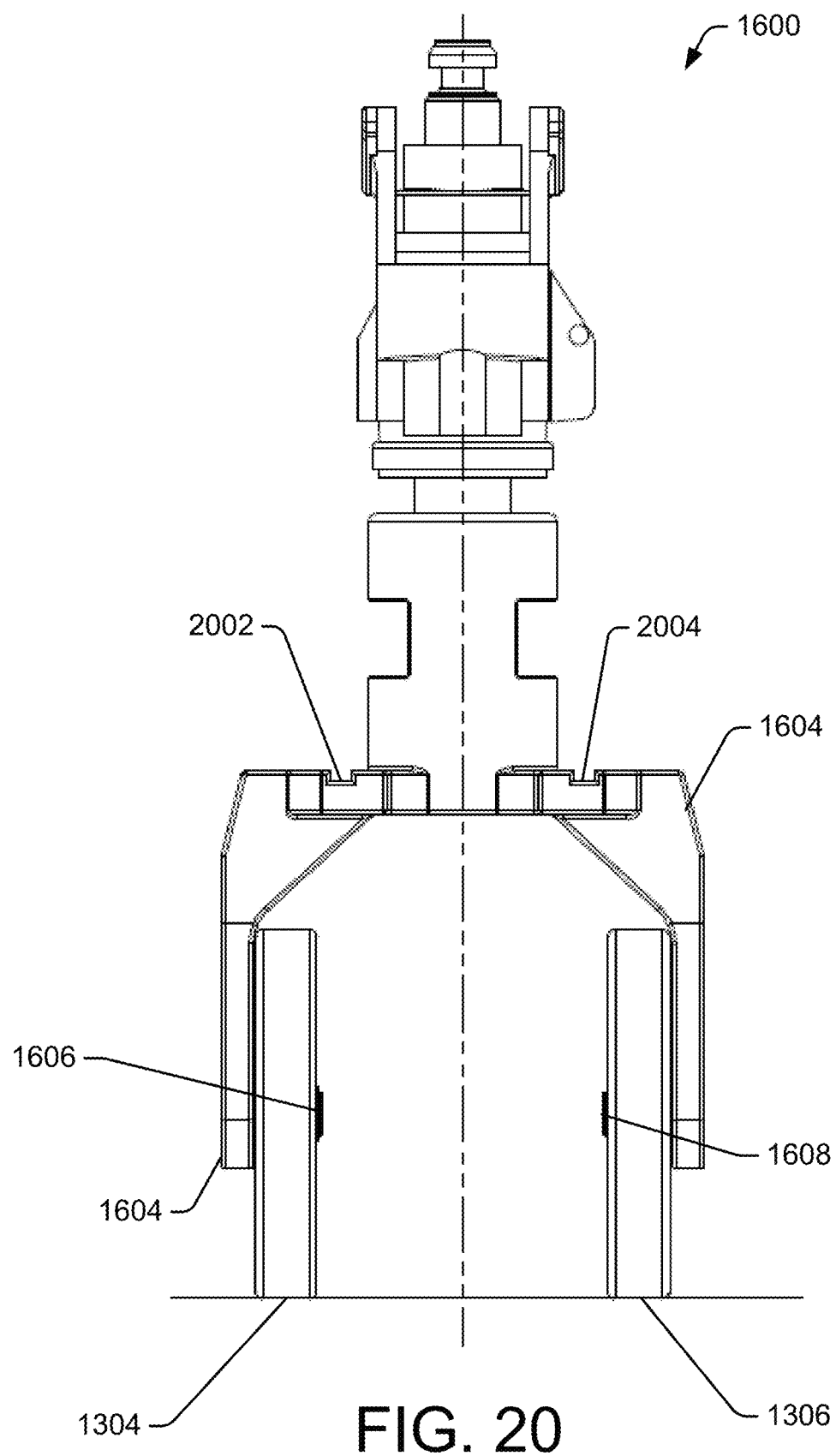
FIG. 20 is a front orthographic view of steering wheels of a pallet jack, wherein the drive wheel has been removed to allow use of the pallet jack in a manual configuration.

The example power and steering assembly 1600 may be utilized in one or more configurations. In one example, the drive wheel 1302 is supported by the floor and the steering wheels 1304, 1306 are elevated above the floor (e.g., FIG. 16). This configuration may result in low-load circumstances. In a second example, the drive wheel and the steering wheels are all supported by the floor (e.g., FIG. 17), which may result in heavier load circumstances. In a third example, the drive wheel is elevated off the floor and the steering wheels are supported on the floor (e.g., FIG. 18), which may result when tension forcing the drive wheel down is released and the drive wheel is elevated to allow manual operation. In a fourth example, the drive wheel power assembly 2100 (e.g., seen in FIG. 21) may be removed from the pallet jack, resulting in a manual operation (as seen in FIG. 20).

Figure 16:
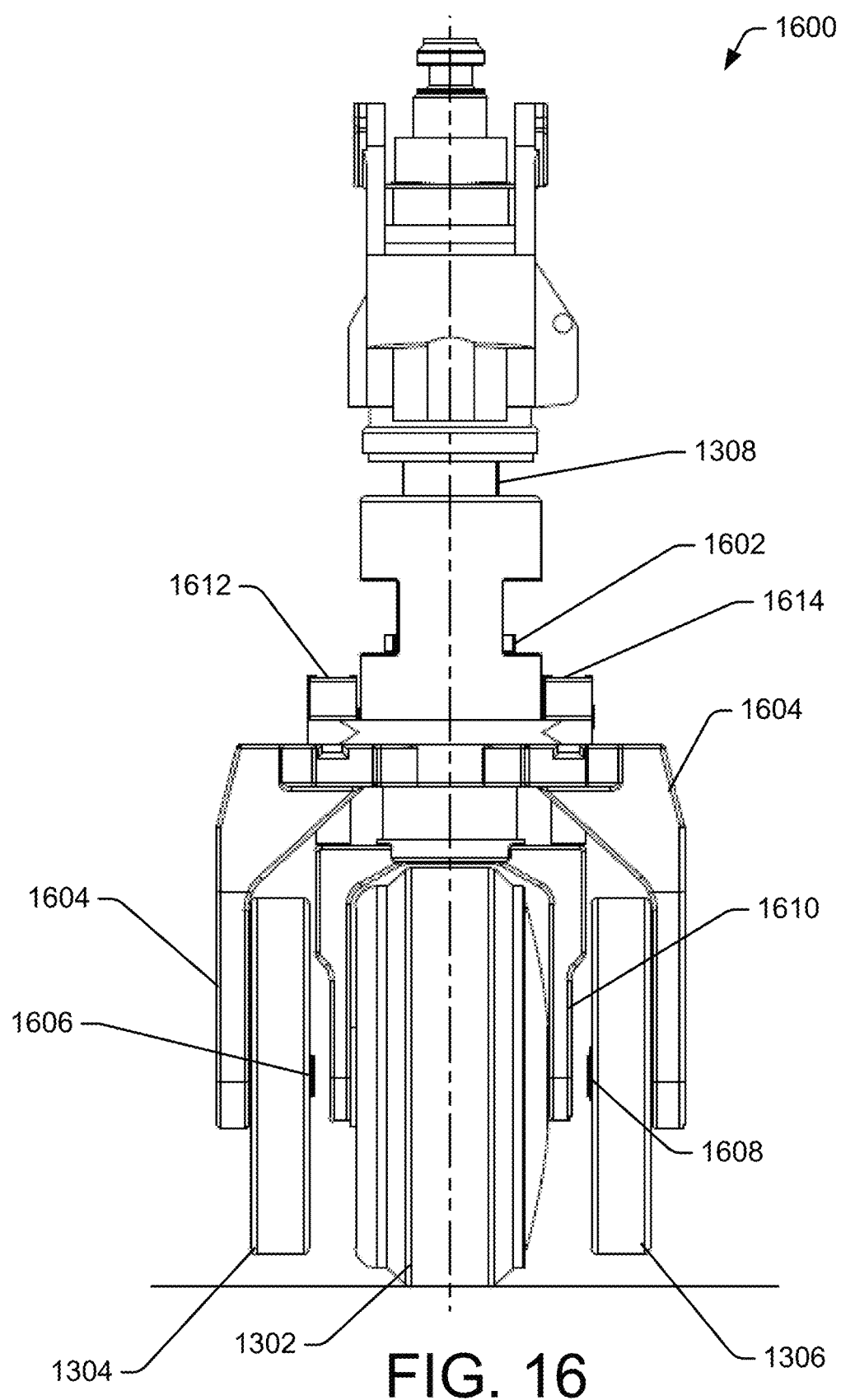
FIG. 16 is a front orthographic view of the steering wheels and drive wheel of a pallet jack, wherein a light-load is insufficient to overcome bias of a spring and lower the steering wheels to the supporting floor.

FIG. 16 shows an example configuration, wherein the steering wheels 1304, 1306 are elevated slightly and not touching the floor, due to no-load or light-loading that is insufficient to overcome bias of a spring 1602. The left and right steering wheels 1304, 1306 may be supported by a steering wheel support bracket 1604 configured to rotate about an axis going through the lifting or jacking cylinder 1308 of a hydraulic unit as a user operates the handle 1310 (e.g., as seen in FIG. 13).

Figure 23:
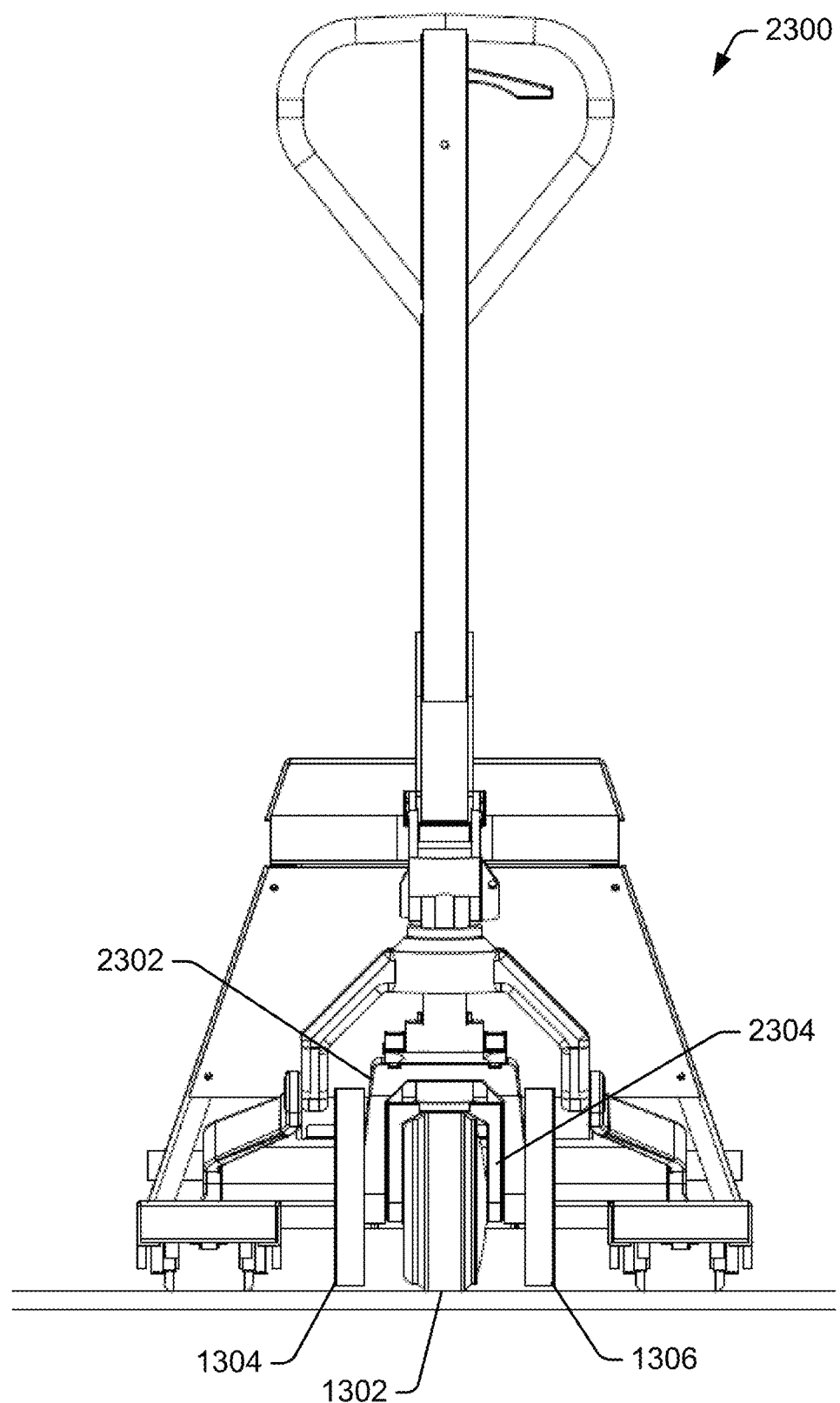
FIG. 23 is a rear orthographic view of an example pallet jack having steering wheels supported by an outside of the steering wheel support bracket, wherein a load is insufficient to lower the steering wheels to the floor.

The steering wheel support bracket 1604 may support the left and right steering wheels with left and right axles 1606, 1608, respectively. The steering wheel support bracket 1604 may be configured as one or more components in a unitary or compound design. In the example shown, the left and right steering wheels are located on the inside or on a medial side of the steering wheel support bracket 1604. However, the steering wheels could alternatively be located on the outside of the bracket 1604 (e.g., as seen in FIG. 23).

A drive wheel support bracket 1610 may be configured to support the drive wheel 1302 between the left and right steering wheels 1304, 1306. The drive wheel support bracket 1610 may be configured to rotate about the jacking cylinder 1308, and to be attached to, and rotate with, the steering wheel support bracket 1604 during turning operations. The steering wheel support bracket 1604 and the drive wheel support bracket 1610 may move vertically with respect to each other (e.g., one bracket moves up and/or the other moves down) as energy or energy levels change (e.g., compression, stretching, rotation) in a spring (e.g., spring 1602 of FIG. 19) in response to changing loads on the forked frame.

At least one fastener, such as shoulder bolts 1612, 1614, may be used to connect the drive wheel support bracket 1610 to the steering wheel support bracket 1604. The fastener(s) connect the brackets together, so that the drive wheel support bracket rotates in response to rotation of the steering wheel support bracket, i.e., a common rotational movement. The fastener(s) may also limit vertical movement of the steering wheel support bracket 1604 with respect to the drive wheel support bracket 1610. For example, the limits of vertical movement may be realized by comparison of FIG. 16, wherein the drive wheel 1302 is lowered and the steering wheels 1304, 1306 are raised, and FIG. 18, wherein the drive wheel is raised and the steering wheels are lowered. Removal of the least one fastener releases of the drive wheel and the drive wheel support bracket from the pallet jack. FIG. 20 shows an example of portions of the pallet jack after removal of the power and steering assembly 1600.

A lighter load (as seen in FIG. 16) may result in spring compression that is insufficient to lower the steering wheels 1304, 1306 to the floor. If the steering wheels are raised off the floor by the spring 1602, operation of the drive wheel 1302 steers and powers the pallet jack. By keeping the steering wheels off the floor during light-load conditions, the drive wheel 1302 has enough friction with the floor to move the pallet jack.

Figure 17:
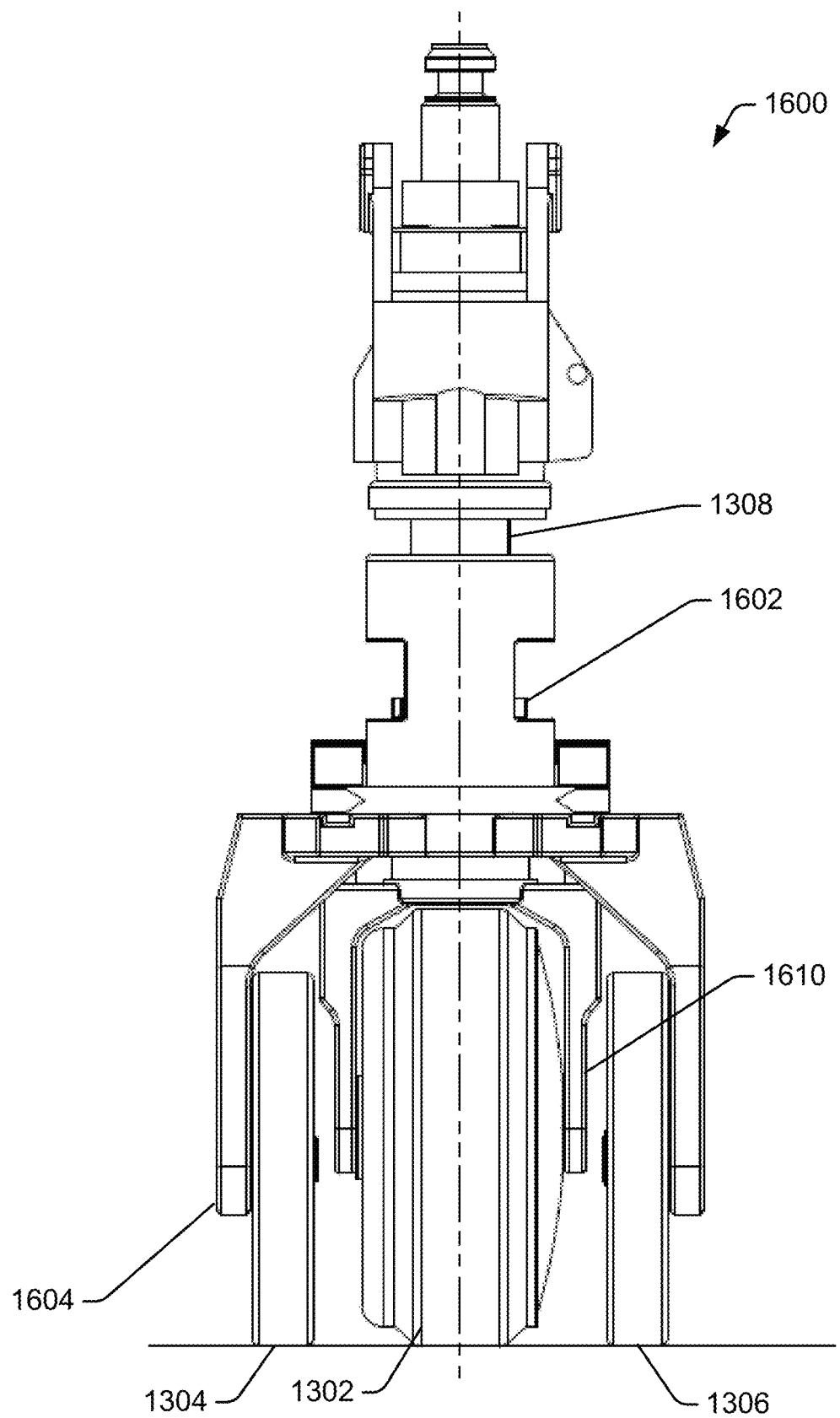
FIG. 17 is a front orthographic view, showing the steering wheels lowered to the supporting floor, such as by a load sufficient to overcome bias of a spring.

FIG. 17 shows the example power and steering assembly 1600 in conditions in which a load has compressed the spring 1602 to the point that the steering wheels 1304, 1306 are lowered to the supporting floor. As the spring 1602 compresses (i.e., as load is added to the forked frame 1402 of the pallet jack 1300) the steering wheel support bracket 1604 and the drive wheel support bracket 1610 move vertically with respect to each other. In one example, the spring 1602 is compressed responsive to a weight of a load carried by the pallet jack, wherein a heavier load results in greater spring compression and lowers the steering wheels 1304, 1306 to the supporting floor.

A heavier load (resulting in the conditions seen in FIG. 17) may result in spring compression that is sufficient to lower the steering wheels 1304, 1306 to the floor. If the steering wheels are lowered to the floor responsive to compression of the spring 1602, the load is shared by the steering wheels and drive wheel. At least in part due to the greater load and the bias of the spring, the drive wheel 1302 has enough friction with the floor to move the pallet jack.

Figure 18:
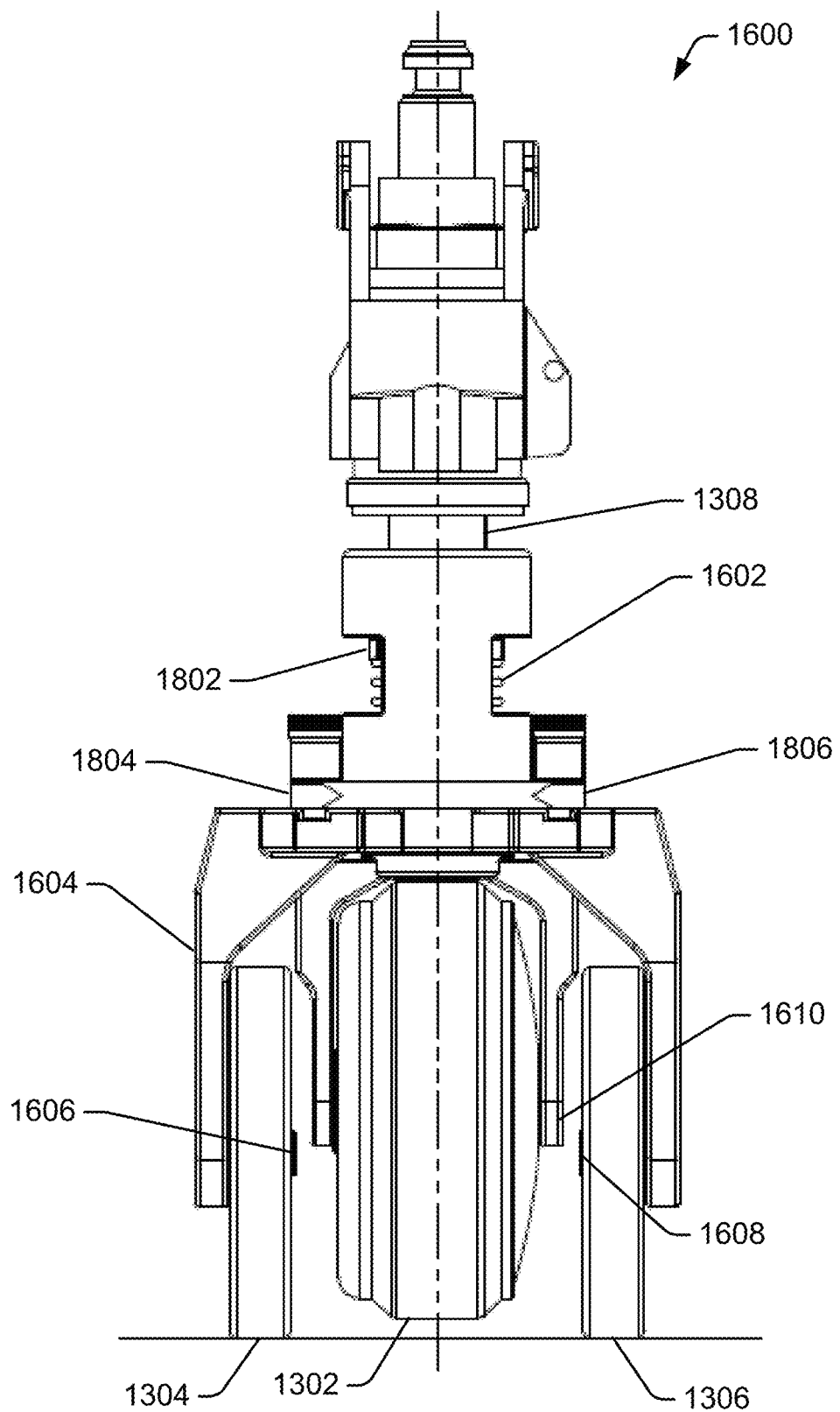
FIG. 18 is a front orthographic view of the steering wheels and drive wheel of a pallet jack, wherein the drive wheel has been elevated to allow use of the pallet jack in a manual configuration.

FIG. 18 shows the example power and steering assembly 1600 in a configuration wherein the drive wheel 1302 has been elevated to a position above the floor. The steering wheels 1304, 1306 remain on the floor, supporting the pallet jack. With the drive wheel elevated, the user may operate the pallet jack in a manual configuration. To elevate the drive wheel, a spring retainer nut 1802 may be adjusted to relax tension on the spring 1602. With the tension relaxed, the drive wheel 1302 may be moved to, and/or retained in, an elevated position. In the example shown, slide blocks 1804, 1806 or other fastener(s) or element(s) (e.g., retaining element 3002 of FIG. 30) may be used to move and/or hold the drive wheel 1302 off the floor. Thus, the spring retainer nut 1802 or other fastener(s) may be used to control bias of the spring 1602 and to control vertical movement of the drive wheel support bracket 1610 with respect to the steering wheel support bracket 1604. After withdrawal of the spring retainer nut 1802 and relaxation of the spring 1602, at least one slide block 1804 or other fastener may be used to hold the drive wheel 1302 in an elevated position off the floor after relaxation of the tension of the spring.

Figure 19:
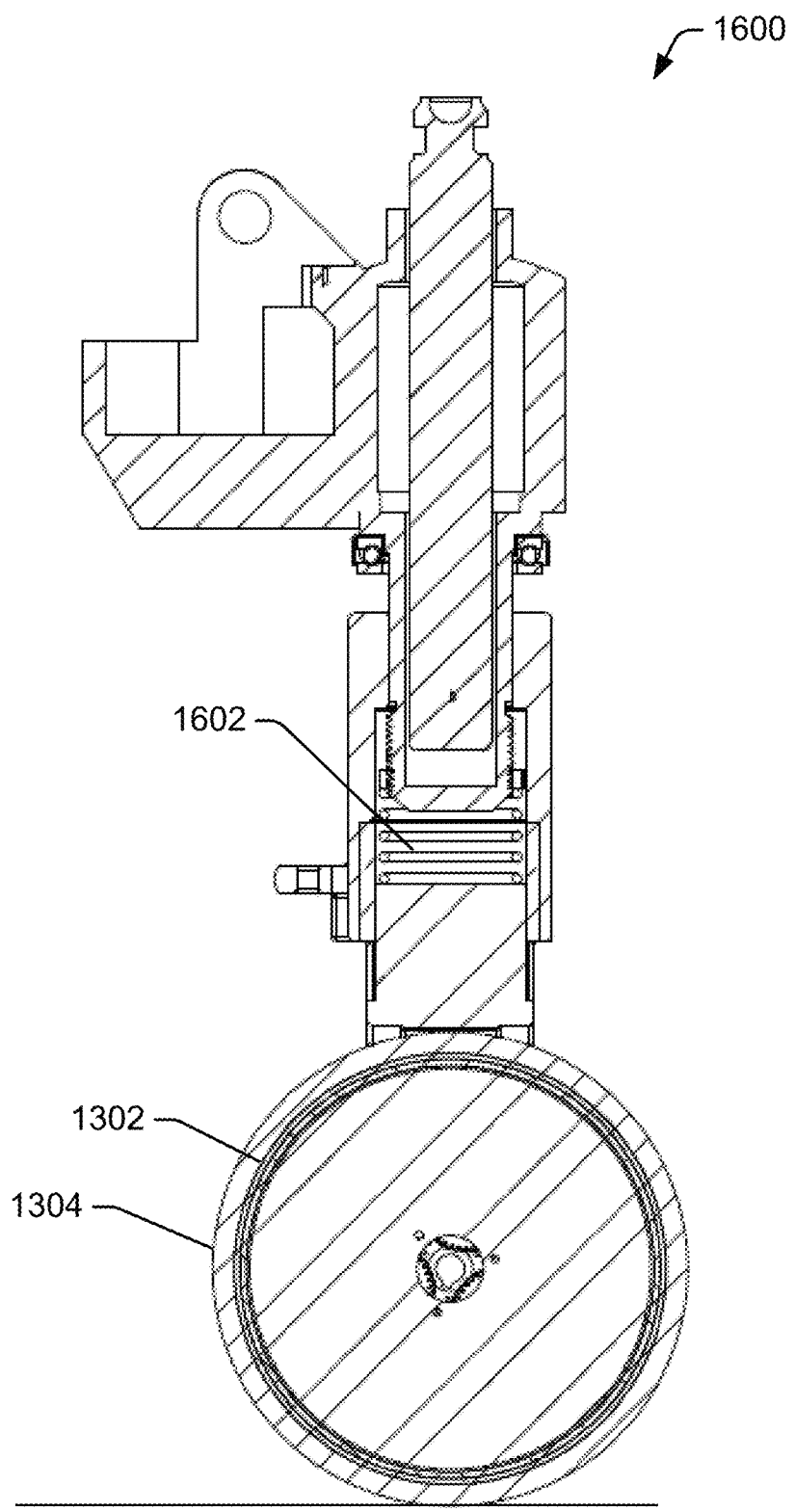
FIG. 19 is a side cross sectional view of a drive wheel, showing a steering wheel behind the drive wheel.

FIG. 19 shows a cross sectional view of the power and steering assembly 1600 showing the drive wheel 1302 in an elevated position and one of the steering wheels 1304 in a position in contact with the floor. In the view shown, the spring 1602 is in a relaxed condition, allowing the drive wheel 1302 to be held in an elevated position off the floor.

FIG. 20 shows a view of the power and steering assembly 1600 with the drive wheel 1302 and drive wheel support bracket 1610 removed. By removing the drive wheel and drive wheel support bracket the pallet jack becomes a manual pallet jack. Alternatively, a new drive wheel and motor may be installed. In one example, at least one fastener, such as shoulder bolts 1612, 1614 (seen in FIG. 16), may be removed or released (e.g., from threaded passages 2002, 2004) to allow removal of the drive wheel, drive wheel support bracket and the motor while leaving in place the left and right steering wheels.

Figure 21:
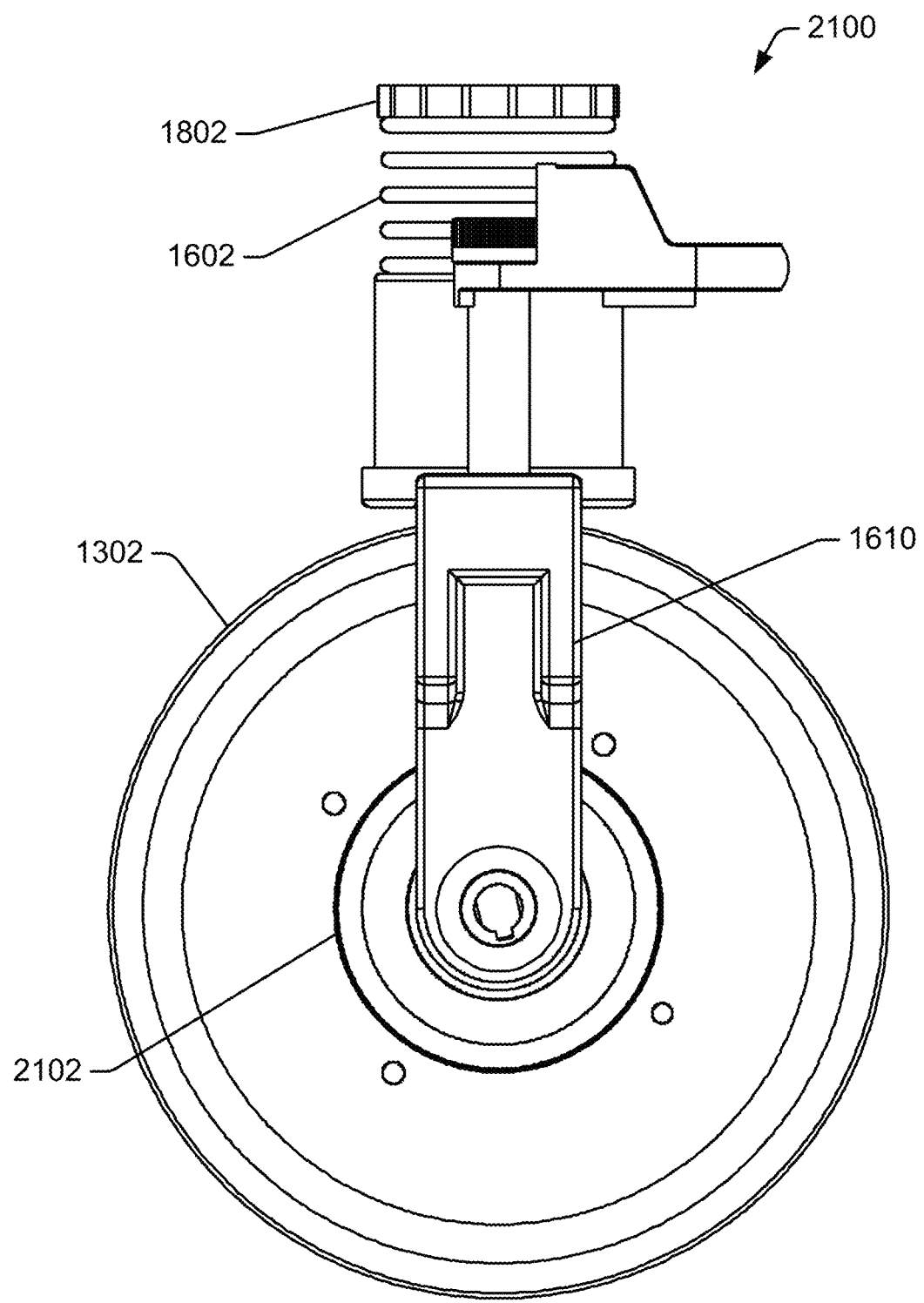
FIG. 21 is a side orthographic view of the drive wheel assembly.

FIG. 21 shows an example of the drive wheel power assembly 2100. The spring retainer nut 1802 is positioned to adjust tension on the spring 1602. When the spring retainer nut 1802 is advanced to compress the spring 1602, the drive wheel 1302 is forced against the floor or supporting surface. In this configuration, a motor 2102 (e.g., which may be located inside the drive wheel), may be used to assist in moving the pallet jack and a load supported by the pallet jack. Thus, the spring biases the drive wheel against the floor and increases friction between the drive wheel and the floor. When the spring retainer nut 1802 is retracted to decompress the spring 1602, the drive wheel 1302 may be raised above the floor and locked into place above the floor. Once locked in place above the floor, the pallet jack may be utilized as a manual pallet jack.

Figure 22:
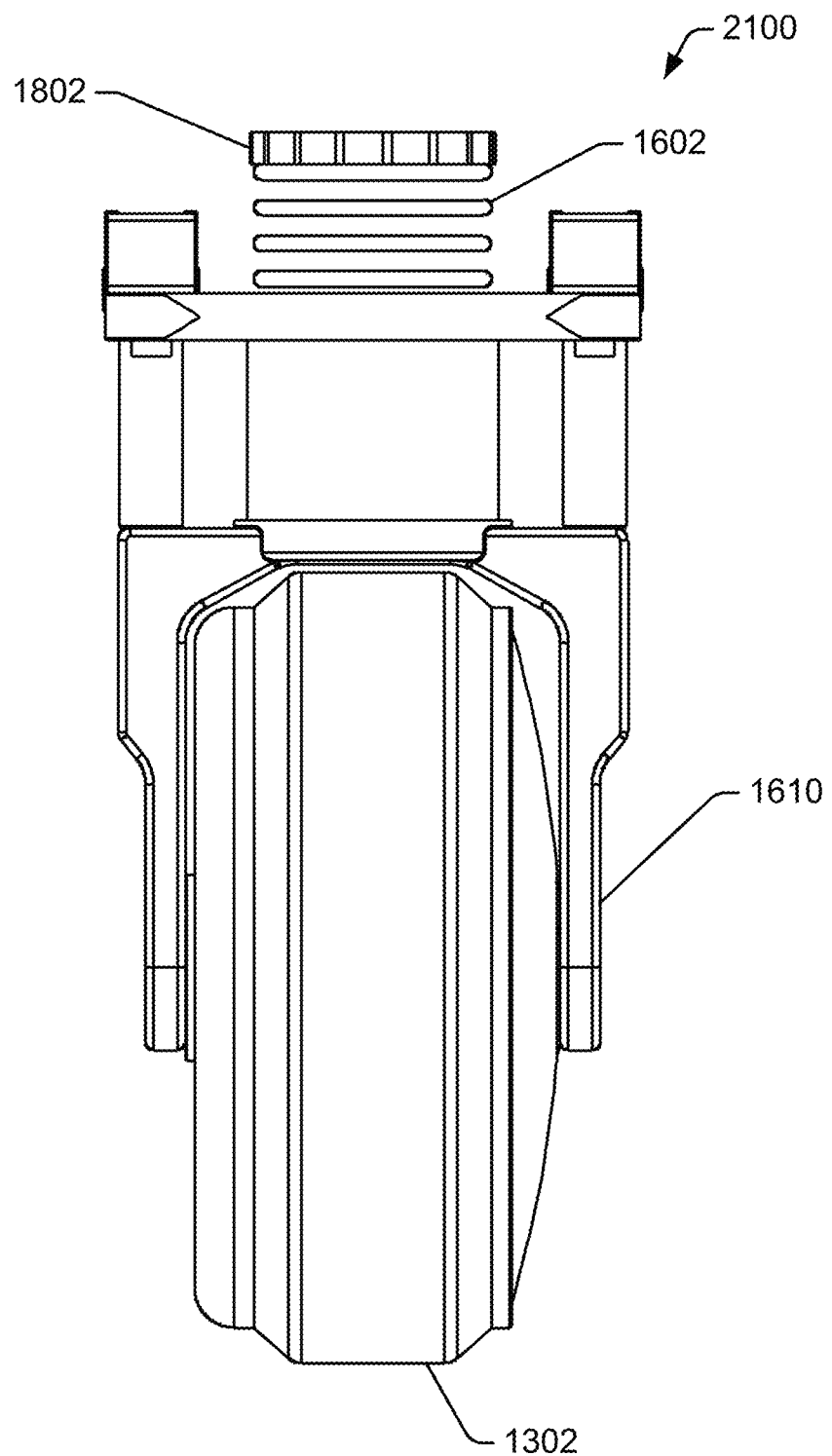
FIG. 22 is a front orthographic view of the drive wheel assembly.

FIG. 22 shows an example of the drive wheel assembly 2100, showing the spring retainer nut 1802, the drive wheel 1302 and the drive wheel support bracket 1610.

FIG. 23 shows an example pallet jack 2300 having steering wheels 1304, 1306 in an elevated position above the floor, indicating light-load conditions. In the example shown, the steering wheels are supported by an outside or lateral surface of the steering wheel support bracket 2302. The steering wheel support bracket 2302 may be connected to a drive wheel support bracket 2304, which supports the drive wheel 1302. Because the steering wheel support bracket 2302 is configured to support steering wheels mounted on the outside or lateral surface, the steering wheels may be spaced further apart than if mounted on the inside surface. Greater spacing between the two steering wheels may result in greater stability for the pallet jack. Also, by attaching the steering wheels to the outside surface, the steering wheel support bracket may be narrower in construction. A narrower bracket may be stronger and less likely to bend.

Figure 24:
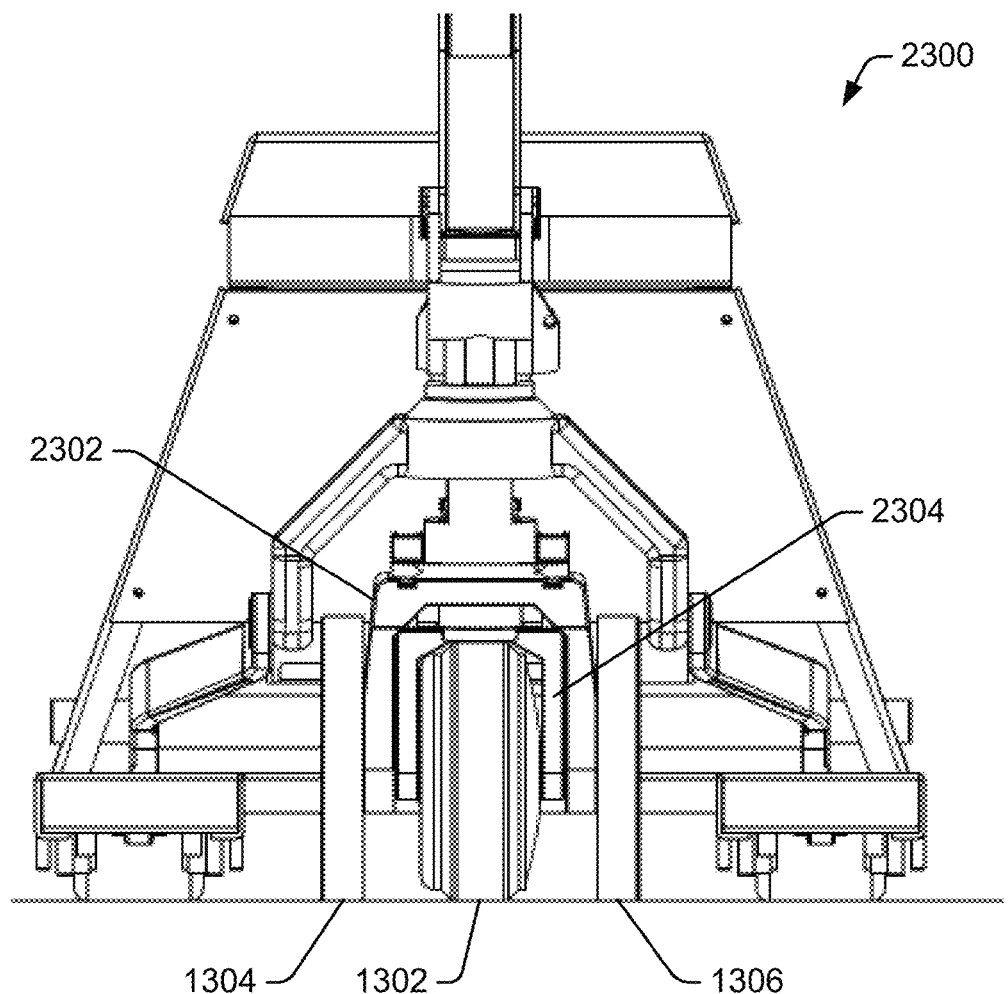
FIG. 24 is a rear orthographic view of an example pallet jack having steering wheels supported by an outside of the steering wheel support bracket, wherein a load is sufficient to lower the steering wheels to the floor.

FIG. 24 shows the example pallet jack 2300 having steering wheels 1304, 1306 in a lowered position against the floor, indicating that the pallet jack is carrying a load. The steering wheel support bracket 2302 carries the left and right steering wheels mounted in the outside surface. The drive wheel support bracket 2304 supports the drive wheel 1302 in contact with the floor.

Figure 25:
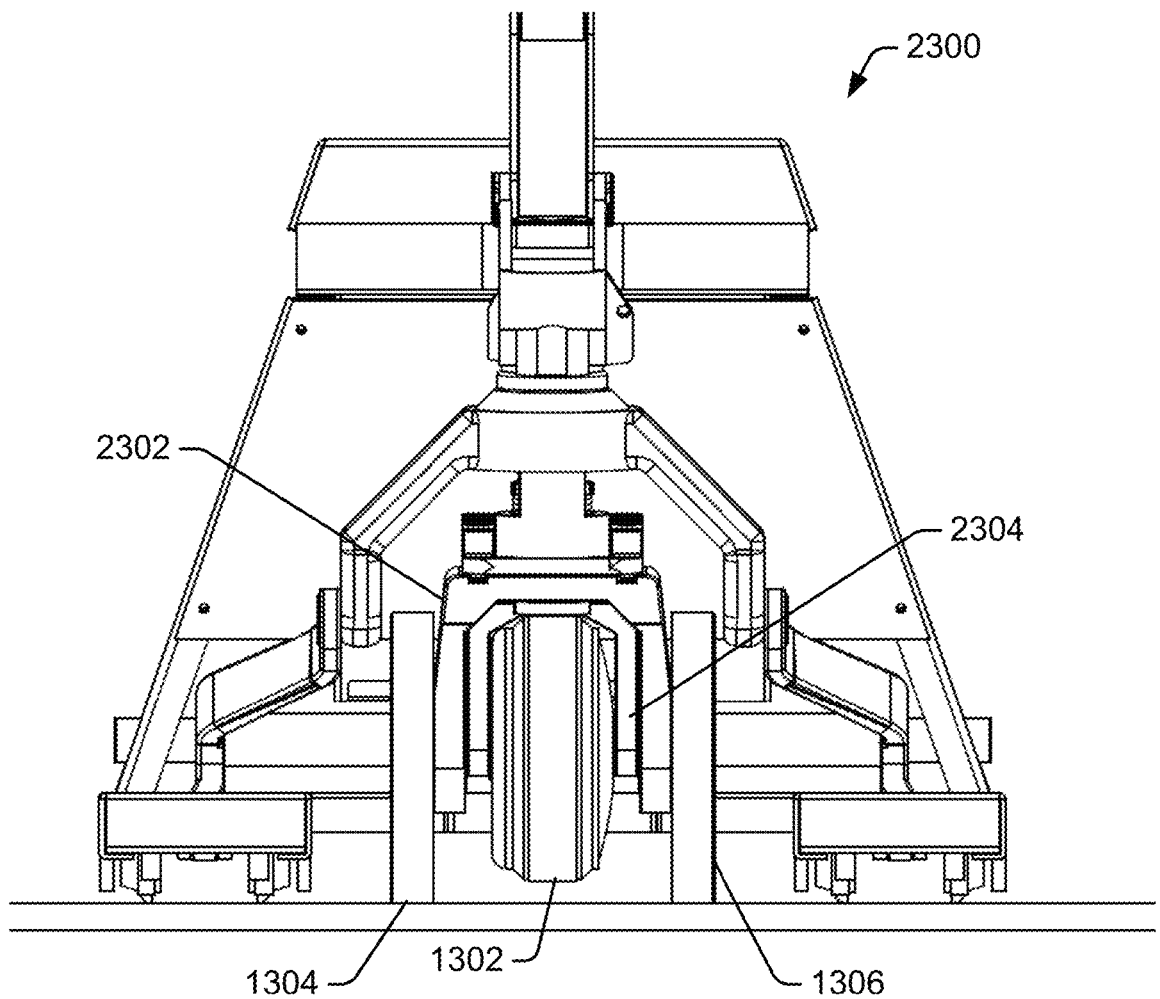
FIG. 25 is a rear orthographic view of an example pallet jack having steering wheels supported by an outside of the steering wheel support bracket, wherein tension has been released on the drive wheel, which is elevated above the floor.

FIG. 25 shows the example pallet jack 2300 having steering wheels 1304, 1306 supported by an outside surface of the steering wheel support bracket 2302. In the view shown, the tension of the spring has been released on the drive wheel 1302, allowing it to be elevated above the floor.

Figure 26:
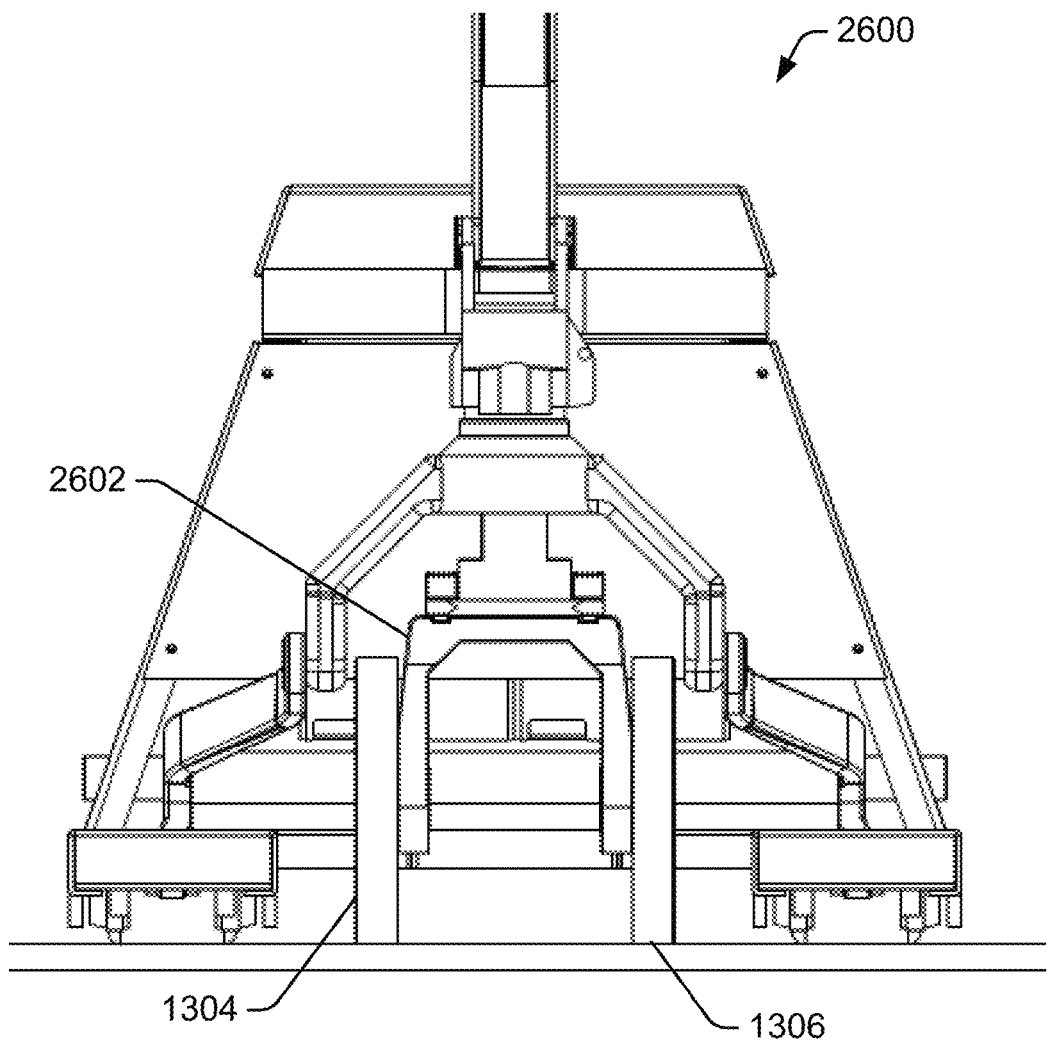
FIG. 26 is a rear orthographic view of an example pallet jack having steering wheels supported by an outside of the steering wheel support bracket, following removal of the drive wheel and drive wheel support bracket.
Figure 27:
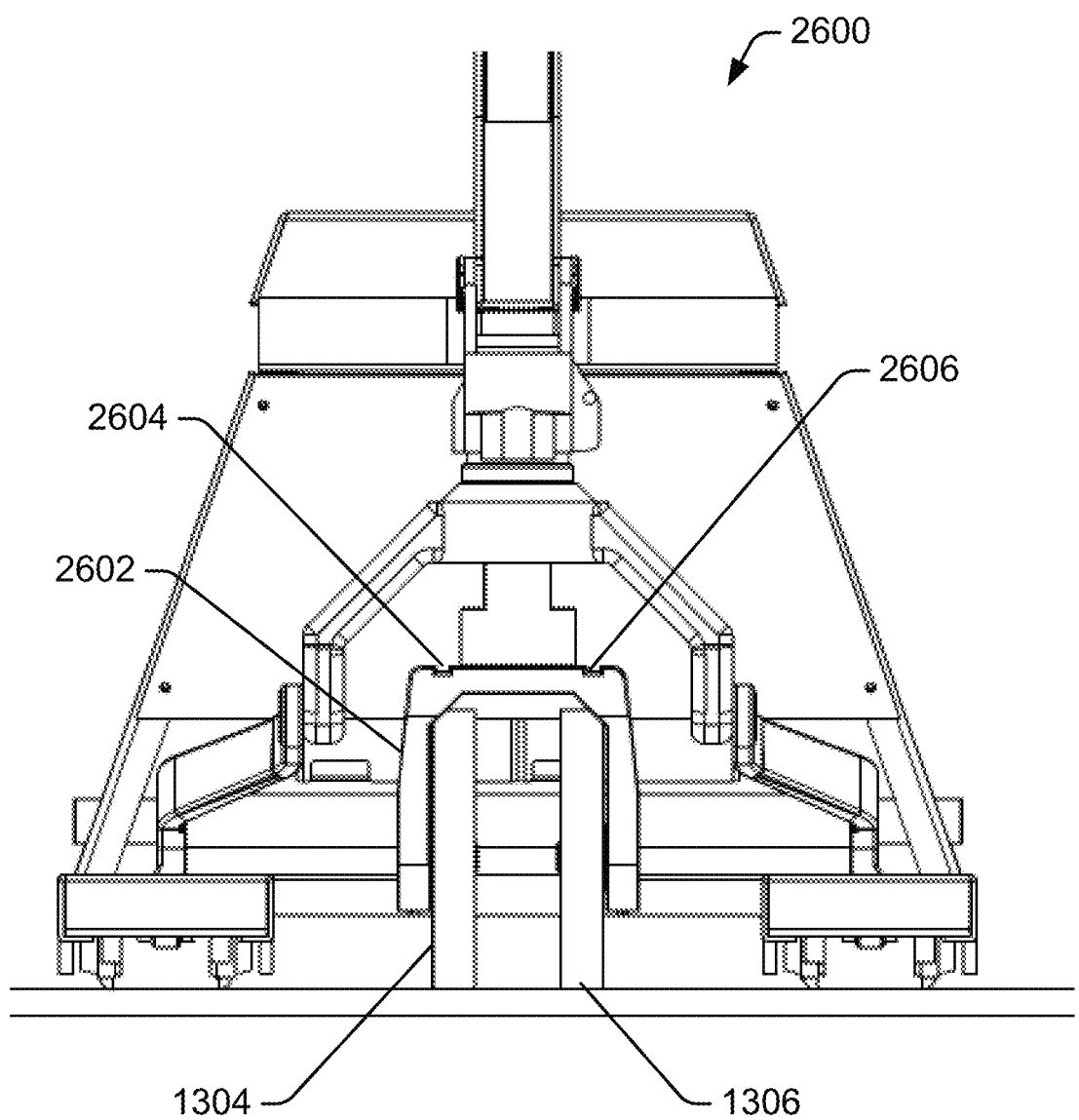
FIG. 27 is a rear orthographic view of an example pallet jack having steering wheels supported by an inside of the steering wheel support bracket consistent with use of the pallet jack in a manual mode.

FIGS. 26 and 27 show a further example pallet jack 2600 that is adapted for use with and without a drive wheel and/or motor. The example pallet jack 2600 may be in the configuration shown in FIG. 26 after removal of the drive wheel and motor, and in the configuration shown in FIG. 27 after reconfiguration of the steering wheels from the outside of the steering wheel support bracket to the inside of that bracket for operation of the pallet jack in the manual mode.

FIG. 26 shows the pallet jack 2600 having steering wheels 1304, 1306 supported on outside or lateral sides of the steering wheel support bracket 2602. In the configuration shown, the steering wheels are separated by a greater distance (than in the configuration seen in FIG. 26). With the steering wheels separated by a greater distance, the pallet jack is still usable in a manual configuration. Additionally, with greater space between the steering wheels, the pallet jack is adapted to receive a drive wheel between the steering wheels, which may be powered by an internal (e.g. hub motor) or external motor. Thus, in the configuration seen in FIG. 26, the pallet jack 2600 is drive wheel or power "ready," and can receive one or more of the drive wheels and/or motors described herein or otherwise available. In one example, one or more fastener(s) release (or install) the drive wheel and the motor while leaving in place the left and right steering wheels, as seen in FIG. 26.

As seen in FIG. 27, the steering wheels 1304, 1306 may be supported on inner or medial sides of the steering wheel support bracket 2602. By locating the steering wheels on the inside of the steering wheel support bracket, the steering wheels are closer together (than in the configuration seen in FIG. 26). With the steering wheels positioned closer together, a user may more easily operate the pallet jack 2600 manually. For example, turning may take less effort and/or a turning radius may be smaller.

In operation, the steering wheels may be switched (in either direction) between the inside of the steering wheel support bracket and the outside of the steering wheel support bracket, and the steering wheel support bracket may be adapted to support steering wheels either inside or outside.

In a variation of the pallet jack 2600, two steering wheel support brackets may be used, one of which is adapted to installation of steering wheels on the inside and one of which is adapted to installation of steering wheels on the outside. Each of the two steering wheel support brackets may be configured for removal from the pallet jack 2600 and replacement with the other bracket. Accordingly, one or more fasteners may be utilized to remove one steering wheel support bracket and to replace that bracket with the other steering wheel support bracket.

A number of variations of the pallet jack 2600 can be understood by reference to FIGS. 26 and 27. In a first example, a pallet jack may include a forked frame, a jacking or lifting cylinder to control elevation of the forked frame and left and right steering wheels to support the forked frame. The left and right steering wheels may be reconfigurable between a manual mode (e.g., as seen in FIG. 26) and a powered mode (e.g., as seen in FIG. 27). Also, spacing of the left and right steering wheels may be greater in the power mode than in the manual mode. In a second example, the pallet jack may include a steering wheel support bracket configured for installation of the left and right steering wheels on the inside in the manual mode and configured for installation of the left and right steering wheels on the outside in the power mode. In a third example, the pallet jack may include one or more fasteners (e.g., fasteners 2604, 2606) to allow removal and replacement of a first steering wheel support bracket (e.g., the steering wheel support bracket of FIG. 26) with a second steering wheel support bracket (e.g., the steering wheel support bracket of FIG. 27), wherein the first steering wheel support bracket and the second steering wheel bracket separate the steering wheels by different distances, the distances associated with the powered mode and the manual mode.

Accordingly, the pallet jack 2600 may be configured in a manual mode with steering wheels separated by a smaller distance or in a power-assisted or power-ready mode with steering wheels separated by a greater distance. One steering wheel support bracket provides a structure that separates the two steering wheels by a distance consistent with better handling characteristics in a manual mode, as seen in FIG. 27. Additionally, the same or a different steering wheel support bracket provides a structure that separates the two steering wheels by a distance consistent with addition of a power unit, as seen in FIG. 26.

Figure 28:
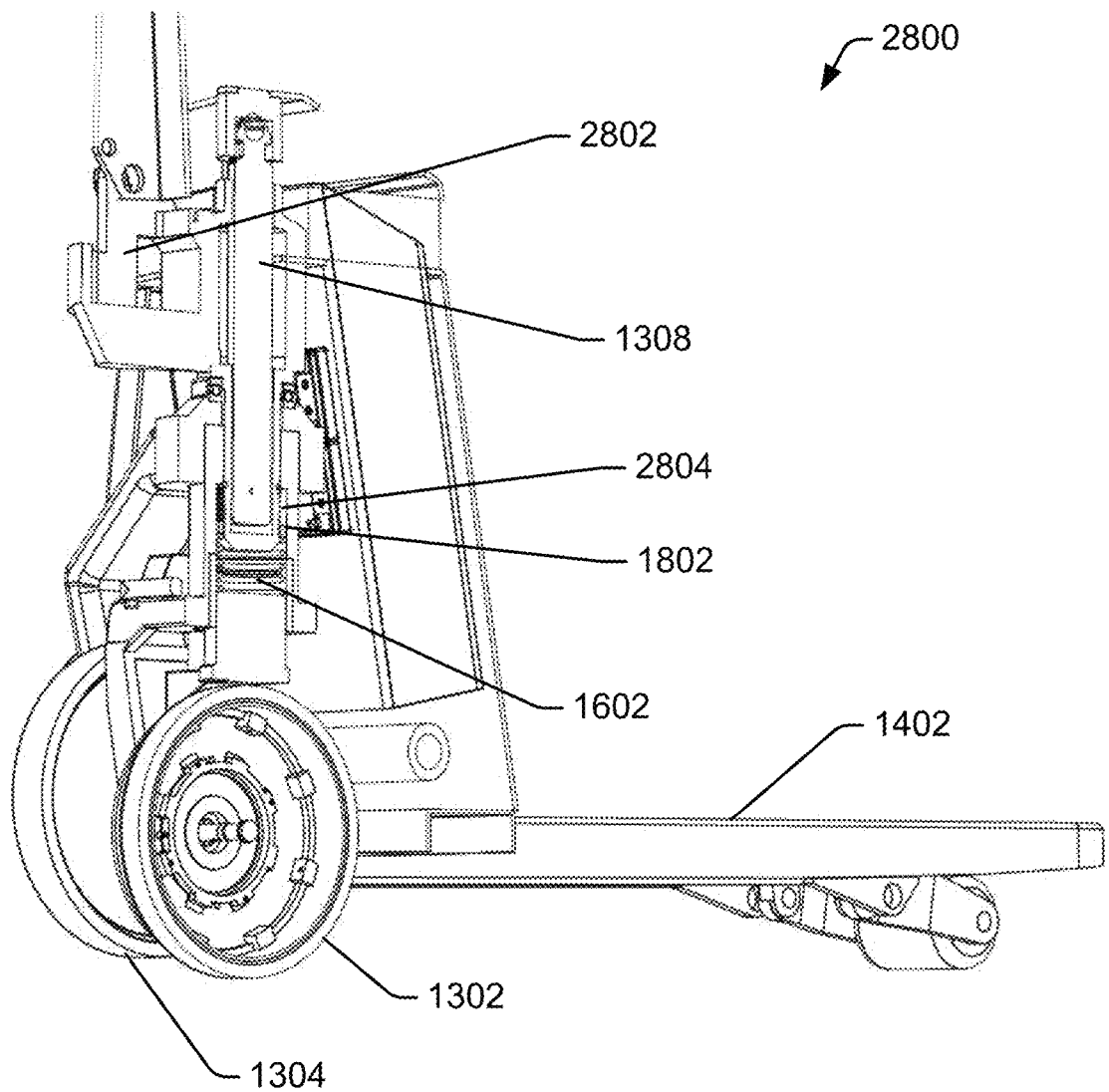
FIG. 28 is cross-sectional view showing a pallet jack with portions of the hydraulic system and drive wheel cut away to show interior components. The left steering wheel is elevated above the drive wheel, indicating a light load.

FIG. 28 shows a pallet jack 2800 in cross-section. A hydraulic jacking cylinder 2802 and hydraulic lifting cylinder 1308 are configured to raise and lower the fork (or tine) 1402. The pallet jack 2800 is shown in light-load or no-load conditions, wherein the spring 1602 is partially relaxed and the left steering wheel 1304 is elevated above the floor. Because the steering wheels are elevated, the drive wheel 1302 supports sufficient weight to create the friction needed to drive the pallet jack. The spring retainer nut, or retainer 1802 travels in the threaded passage 2804, thereby allowing selectable control over compression of the spring (e.g., for given conditions).

Figure 29:
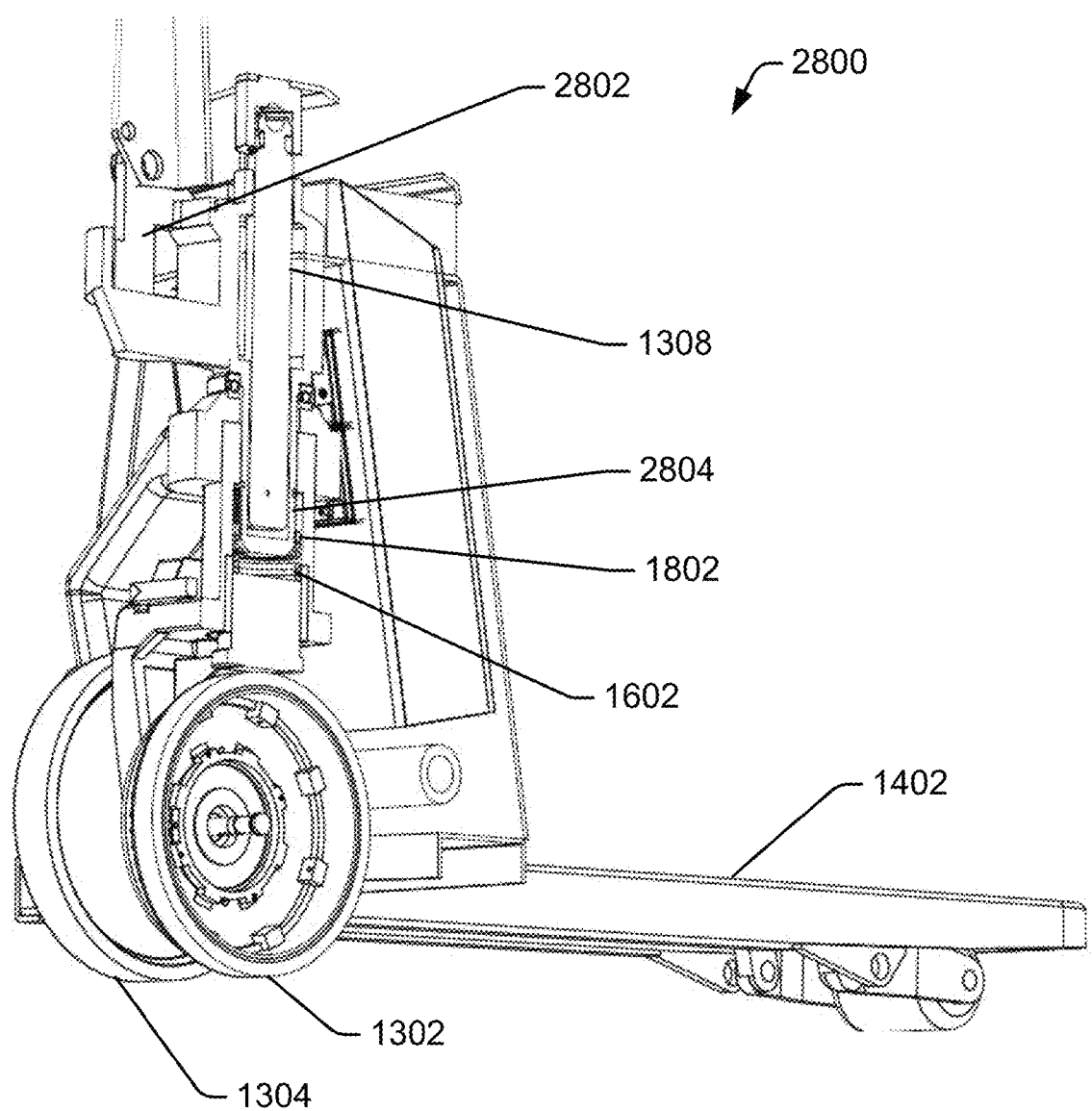
FIG. 29 is cross-sectional view showing a pallet jack with portions of the hydraulic system and drive wheel cut away to show interior components. The left steering wheel and the drive wheel are on the same elevation, indicating a heavy load that has compressed the spring.

FIG. 29 shows the pallet jack 2800 in a loaded condition, wherein the load has compressed the spring 1602, and the left steering wheel 1304 and the drive wheel 1302 are both on the floor. The spring limits the weight supported by the drive wheel, and weight in excess of that amount is carried by the steering wheels. In one example, the spring is selected to require 500 pounds to compress. Accordingly, the drive wheel will not experience greater than a 500 pound load, and additional load is carried by the steering wheels.

Figure 30:
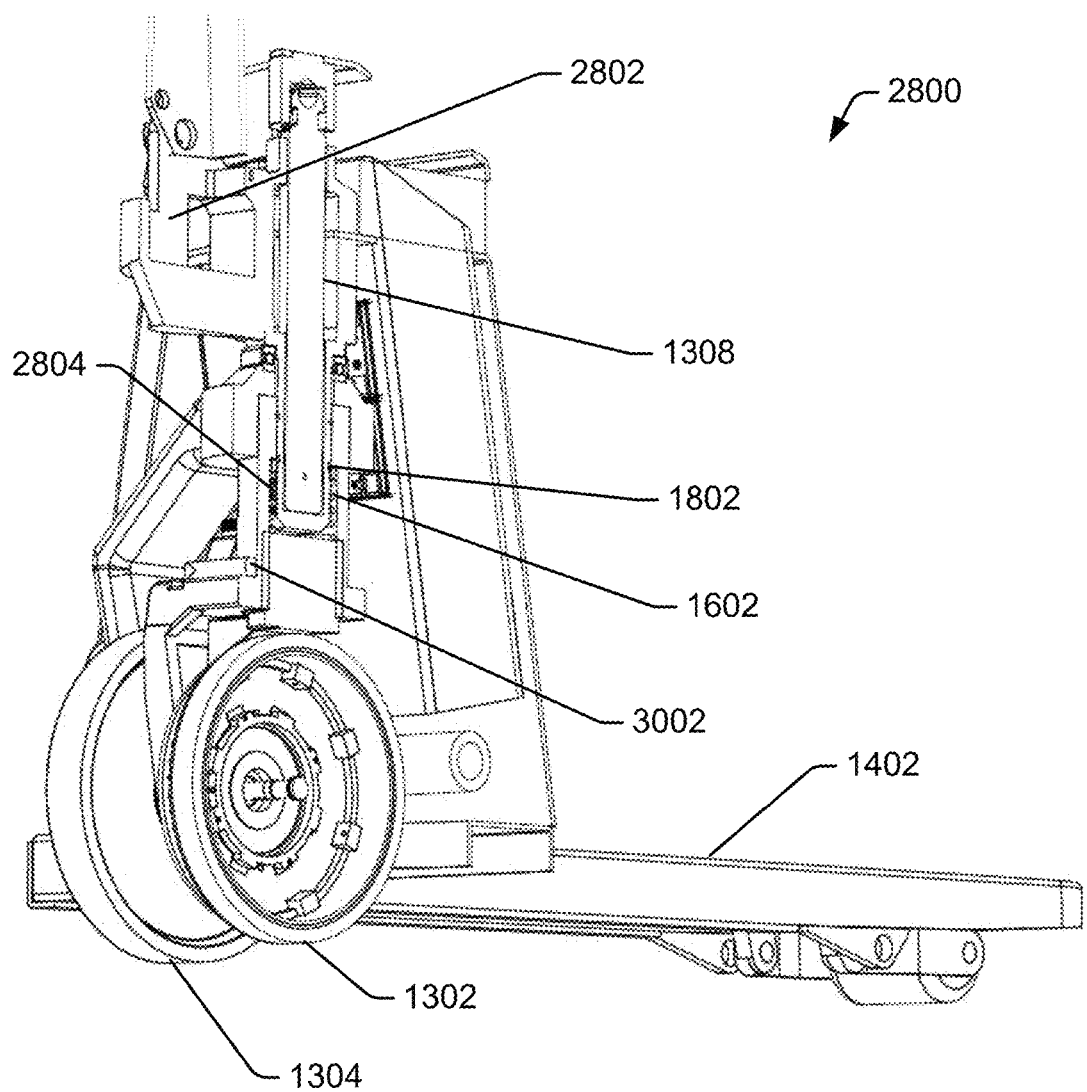
FIG. 30 is cross-sectional view showing a pallet jack with portions of the hydraulic system and drive wheel cut away to show interior components. The drive wheel is elevated above the left steering wheel, indicating that the spring tension has been released and the pallet jack is being used in a manual mode.

FIG. 30 shows the pallet jack 2800 with the spring retainer nut, or retainer 1802, moved upwardly in the threaded passage 2804, to thereby increase the space available to the spring 1602 and to thereby decompress the spring. Accordingly, the spring 1602 is shown in a substantially relaxed and uncompressed state. This allows the drive wheel 1302 to be elevated above the floor or supporting surface. The drive wheel 1302 may be held in an elevated position by slide block(s), fastener(s) or element(s) 3002. With the drive wheel 1302 elevated above the floor, the pallet jack is supported by the steering wheels and is usable in a manual mode.

Figure 31:
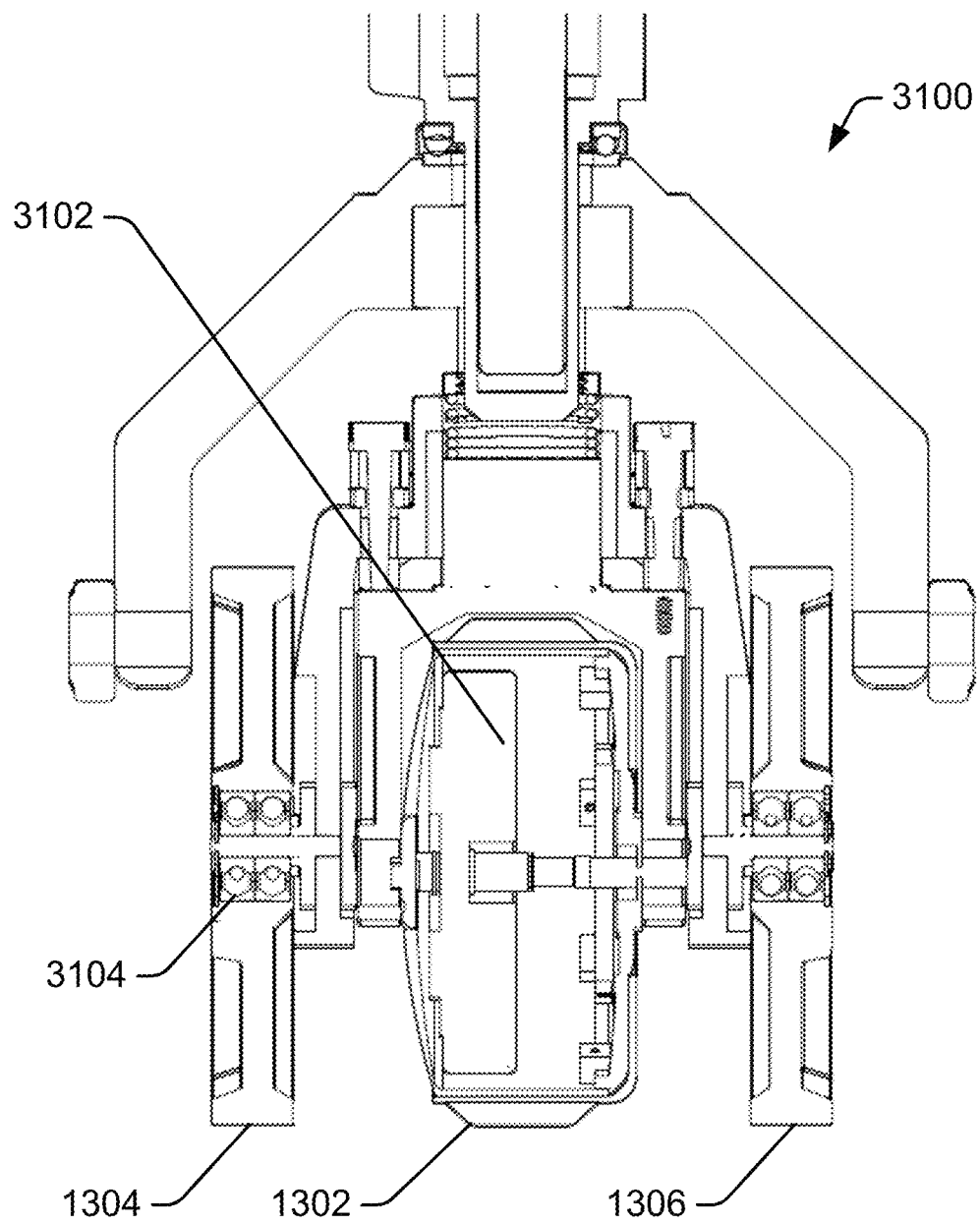
FIG. 31 is a cross-sectional view of a pallet jack showing a hub motor in the drive wheel and bearing surfaces in the steering wheels.

FIG. 31 is a cross-sectional view of a pallet jack 3100 showing a hub motor 3102 in the drive wheel 1302. The bearing surfaces 3104 are shown in the steering wheels 1304, 1306.

Figure 32:
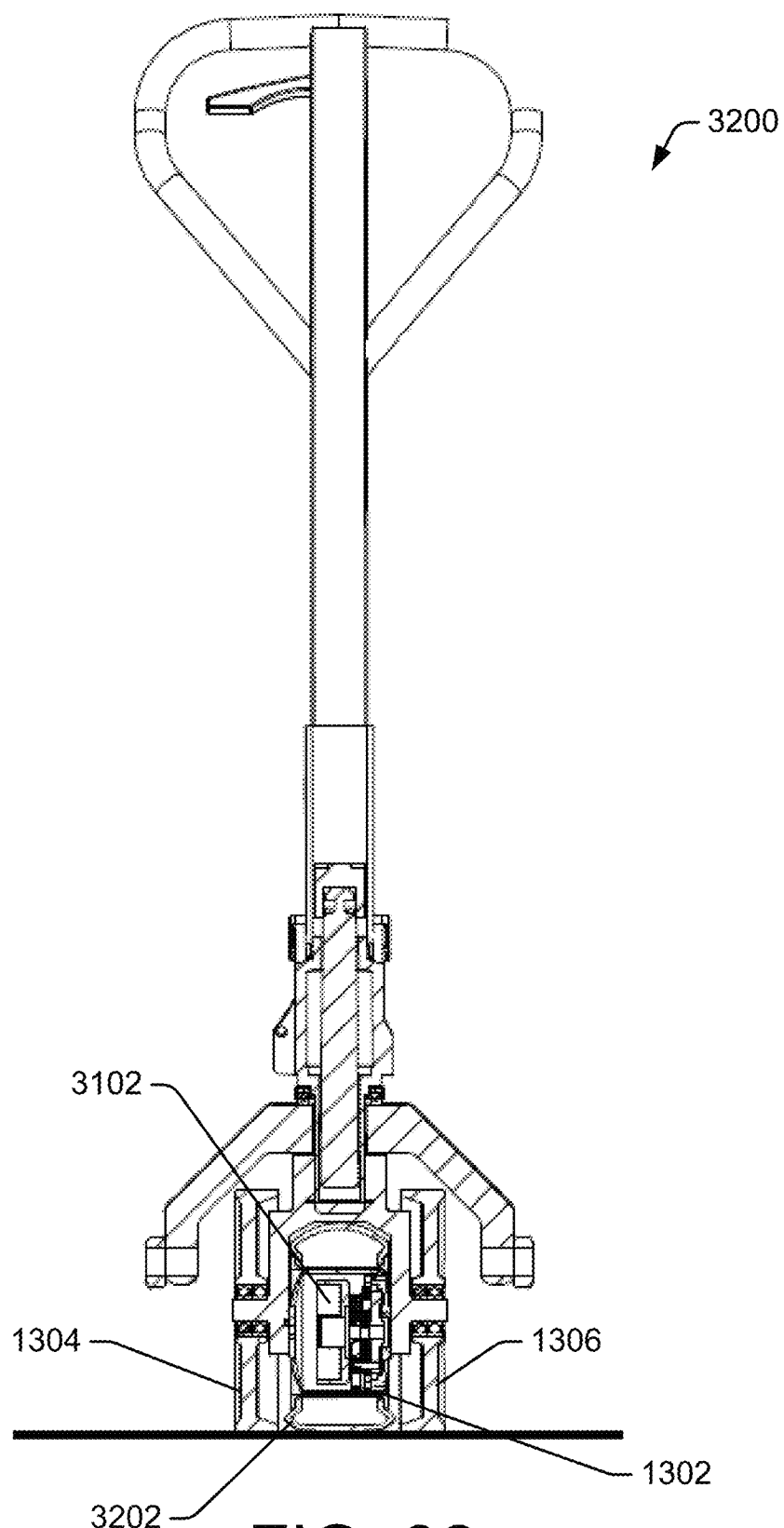
FIG. 32 is a cross-sectional view of a pallet jack having drive wheel with a compliant tire, shown in a loaded utilization wherein the steering wheels are supporting portions of the load.
Figure 33:
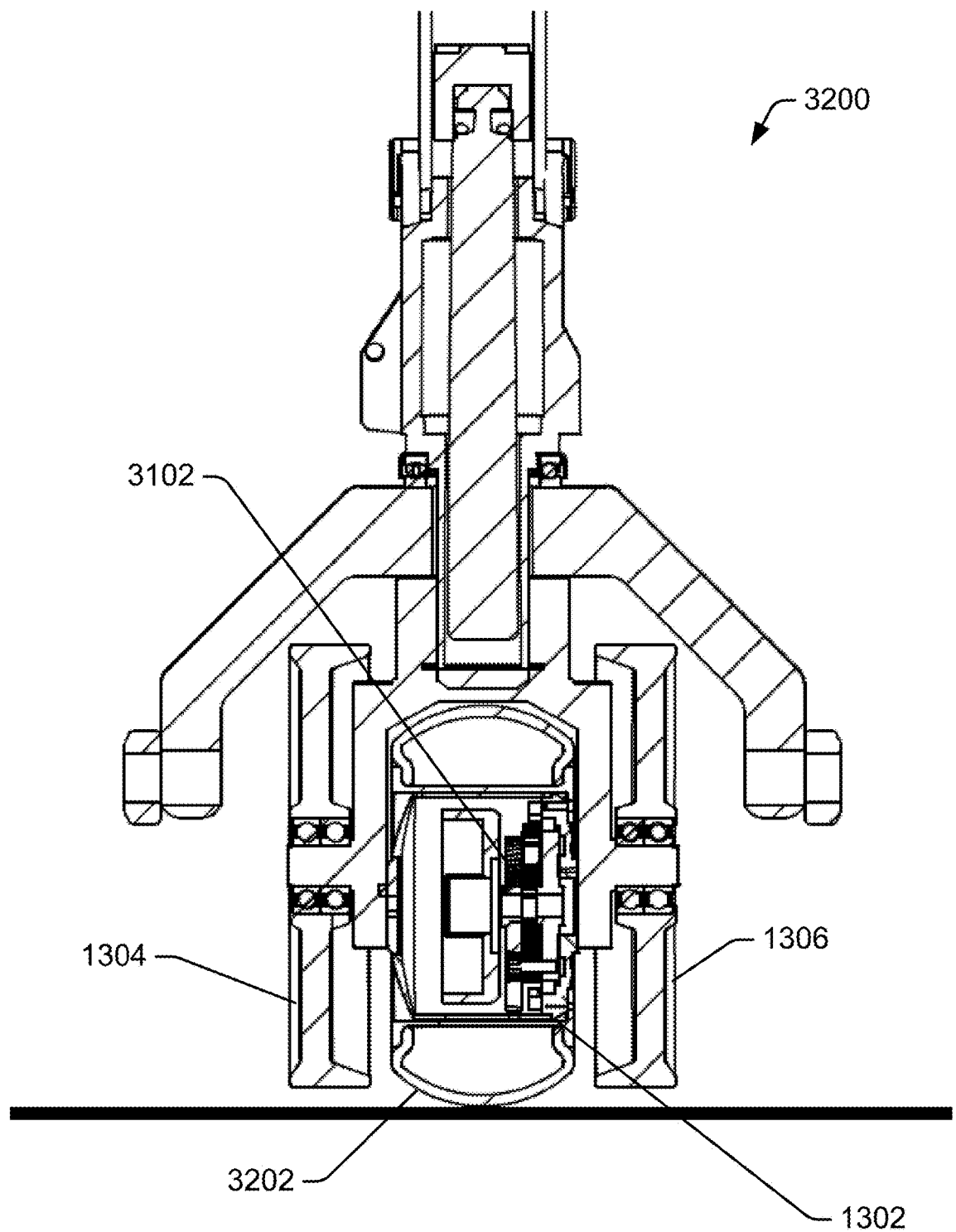
FIG. 33 is a cross-sectional view of a pallet jack having drive wheel with a compliant tire, shown in a low load utilization wherein the steering wheels are elevated above the supporting floor.

FIG. 32 is a cross-sectional view of a pallet jack 3200 having drive wheel 1302 with a compliant tire 3202 and a hub motor 3102. The drive wheel with compliant tire may be located between the left and right steering wheels, wherein a center of each of the steering wheels and a center of the drive wheel are co-planar. The pallet jack is shown in a loaded state, wherein the steering wheels 1304, 1306 support part of the weight of the load. The compliant tire 3202 may be pneumatic or solid, and may be configured to comply and/or deform to match, or contour with, a supporting surface in a manner that depends at least in part on a load carried by the pallet jack 3200. Thus, in the view shown, pallet jack 3200 has sufficient load to deform the compliant tire 3202 on the drive wheel 1302. In a deformed state, the compliant tire 3202 provides a force in the upward direction. The compliant tire 3202 may be resilient, and compression by the load on the pallet jack 3200 is similar to compression of a spring. When the load is lessened, the compliant tire 3202 on the drive wheel 1302 will return to its original shape, as seen in FIG. 33. The compliant tire 3202 may be configured to limit an amount of weight to be supported by the drive wheel 1302. In particular, if the compliant tire is deformed, then additional weight applied to the load of the pallet jack is carried by the steering wheels 1304, 1306.

FIG. 33 is a cross-sectional view of a pallet jack 3200 having drive wheel 1302 with a compliant tire 3202, shown in a low-load utilization wherein the steering wheels 1304, 1306 are elevated above the supporting floor. The compliant tire 3202 is resilient, and in the low-load utilization has assumed a shape that elevates the steering wheels 1304, 1306 off the floor. Accordingly, the compliant tire 3202 acts as a spring, and in low-load conditions assumes a shape that lifts the steering wheels off the floor, while in loaded conditions is deformed to a degree that allows the steering wheels to touch the floor and support considerable portions of the load. In operation, resistance of the compliant tire to deformation (as seen in FIG. 33) provides significant friction with the floor that allows the drive wheel to move the pallet jack.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:
1. A pallet jack, comprising:
   a forked frame;
   a lifting cylinder to control elevation of the forked frame;
   left and right steering wheels to support the forked frame;
   a drive wheel, located between the left and right steering wheels;
   a motor to provide power to the drive wheel;
   a spring to limit a load carried by the drive wheel; and
   a steering wheel support bracket attached to the left and right steering wheels, wherein the left and right steering wheels are attached to respective left and right outside surfaces of the steering wheel support bracket.
2. The pallet jack of claim 1, additionally comprising:
   fasteners to release the drive wheel and the motor while leaving in place the left and right steering wheels.
3. The pallet jack of claim 1, wherein an axle of each of the steering wheels and an axle of the drive wheel are co-planar.
4. The pallet jack of claim 1, wherein the steering wheel support bracket is configured to rotate about an axis going through the lifting cylinder and to support the left and right steering wheels with left and right axles, respectively.
5. The pallet jack of claim 1, further comprising:
   a drive wheel support bracket configured to rotate about an axis going through the lifting cylinder and to support the drive wheel between the left and right steering wheels.
6. The pallet jack of claim 1, wherein an axle of the drive wheel is perpendicular to the lifting cylinder and in a same plane as the lifting cylinder.

7. The pallet jack of claim 1, additionally comprising:
a controller to control resistance of the spring and of allowable vertical movement of the steering wheel support bracket with respect to a drive wheel support bracket.

8. The pallet jack of claim 1, additionally comprising:
a retainer to adjust resistance of the spring; and
at least one element to hold the drive wheel in an elevated position after relaxation of the spring.

9. A pallet jack, comprising:
a forked frame;
a lifting cylinder to control elevation of the forked frame;
left and right steering wheels to support the forked frame;
a drive wheel, located between the left and right steering wheels;
a motor to provide power to the drive wheel;
a spring to limit a load carried by the drive wheel; and
a steering wheel support bracket configured to rotate about an axis going through the lifting cylinder and to support the left and right steering wheels with left and right axles, respectively.

10. The pallet jack of claim 9, additionally comprising:
fasteners to release the drive wheel and the motor while leaving in place the left and right steering wheels.

11. The pallet jack of claim 9, wherein an axle of each of the steering wheels and an axle of the drive wheel are co-planar.

12. The pallet jack of claim 9, wherein the left and right steering wheels are attached to respective left and right outside surfaces of the steering wheel support bracket.

13. The pallet jack of claim 9, further comprising:
a drive wheel support bracket configured to rotate about an axis going through the lifting cylinder and to support the drive wheel between the left and right steering wheels.

14. The pallet jack of claim 9, wherein an axle of the drive wheel is perpendicular to the lifting cylinder and in a same plane as the lifting cylinder.

15. The pallet jack of claim 9, additionally comprising:
a controller to vary resistance of the spring and of allowable vertical movement of a steering wheel support bracket with respect to a drive wheel support bracket.

16. The pallet jack of claim 9, additionally comprising:
a retainer to adjust resistance of the spring; and
at least one element to hold the drive wheel in an elevated position after relaxation of the spring.

17. A pallet jack, comprising:
a forked frame;
a lifting cylinder to control elevation of the forked frame;
left and right steering wheels to support the forked frame;
a drive wheel, located between the left and right steering wheels;
a motor to provide power to the drive wheel;
a spring to limit a load carried by the drive wheel; and
a steering wheel support bracket to support the left and right steering wheels;
a drive wheel support bracket to support the drive wheel; and
at least one fastener to connect the drive wheel support bracket to the steering wheel support bracket, to rotate the drive wheel support bracket in response to rotation of the steering wheel support bracket, and to limit vertical movement of the steering wheel support bracket with respect to the drive wheel support bracket.

18. The pallet jack of claim 17, additionally comprising:
fasteners to release the drive wheel and the motor while leaving in place the left and right steering wheels.

19. The pallet jack of claim 17, wherein an axle of each of the steering wheels and an axle of the drive wheel are co-planar.

20. The pallet jack of claim 17, wherein
the drive wheel support bracket is configured to rotate about an axis going through the lifting cylinder and is configured to support the drive wheel between the left and right steering wheels.

* * * * *